(12) United States Patent
Suzuki et al.

(10) Patent No.: US 8,089,521 B2
(45) Date of Patent: Jan. 3, 2012

(54) IMAGING DEVICE, IMAGE PROCESSING METHOD, IMAGE PROCESSING PROGRAM, AND RECORDING MEDIUM

(75) Inventors: Hiroyuki Suzuki, Tokyo (JP); Manabu Ukai, Tokyo (JP)

(73) Assignee: Sony Corporation (JP)

( * ) Notice: Subject to any disclaimer, the term of this patent is extended or adjusted under 35 U.S.C. 154(b) by 503 days.

(21) Appl. No.: 11/440,927

(22) Filed: May 25, 2006

(65) Prior Publication Data

US 2006/0290787 A1     Dec. 28, 2006

(30) Foreign Application Priority Data

Jun. 28, 2005   (JP) ................... 2005-187702

(51) Int. Cl.
    *H04N 5/225*     (2006.01)
(52) U.S. Cl. ............. 348/220.1; 348/333.02; 348/333.05
(58) Field of Classification Search ................ None
    See application file for complete search history.

(56) References Cited

U.S. PATENT DOCUMENTS

| | | | |
|---|---|---|---|
| 6,504,573 B2 * | 1/2003 | Kubota et al. ............ | 348/270 |
| 6,871,010 B1 * | 3/2005 | Taguchi et al. ........... | 386/120 |
| 2002/0047822 A1 * | 4/2002 | Senda et al. .............. | 345/90 |
| 2002/0196348 A1 * | 12/2002 | Kubo ..................... | 348/220.1 |
| 2007/0291152 A1 * | 12/2007 | Suekane et al. .......... | 348/333.02 |
| 2009/0116692 A1 * | 5/2009 | Paul et al. ................ | 382/103 |

FOREIGN PATENT DOCUMENTS

| | | |
|---|---|---|
| JP | 5-292444 A | 11/1993 |
| JP | 8-275034 A | 10/1996 |
| JP | 9-186955 A | 7/1997 |
| JP | 9-200588 A | 7/1997 |
| JP | 9-261514 A | 10/1997 |
| JP | 10-234002 A | 9/1998 |
| JP | 2001-128036 A | 5/2001 |
| JP | 2001-296584 A | 10/2001 |
| JP | 2002-094854 A | 3/2002 |
| JP | 2002-262241 A | 9/2002 |
| JP | 2003-259272 A | 9/2003 |
| JP | 2004-140879 A | 5/2004 |
| JP | 2004-304425 A | 10/2004 |
| JP | 2004-312218 A | 11/2004 |
| JP | 2005-051810 A | 2/2005 |
| JP | 2005-057361 A | 3/2005 |

* cited by examiner

*Primary Examiner* — Anthony J Daniels
(74) *Attorney, Agent, or Firm* — Lerner, David, Littenberg, Krumholz & Mentlik, LLP

(57) ABSTRACT

Disclosed is an imaging device including: imaging means for capturing an image; moving image data generation means for generating moving image data as image data for a moving image from an image captured by the imaging means; still image data generation means for, when the moving image data generation means generates the moving image data, generating still image data as image data for a still image from an image captured by the imaging means; and display data generation means for, when the moving image data is generated, generating first display data for displaying an image corresponding to the moving image data and, when the still image data is generated, generating second display data for displaying an image representing generation of the still image data in parallel with generation of the first display data.

18 Claims, 23 Drawing Sheets

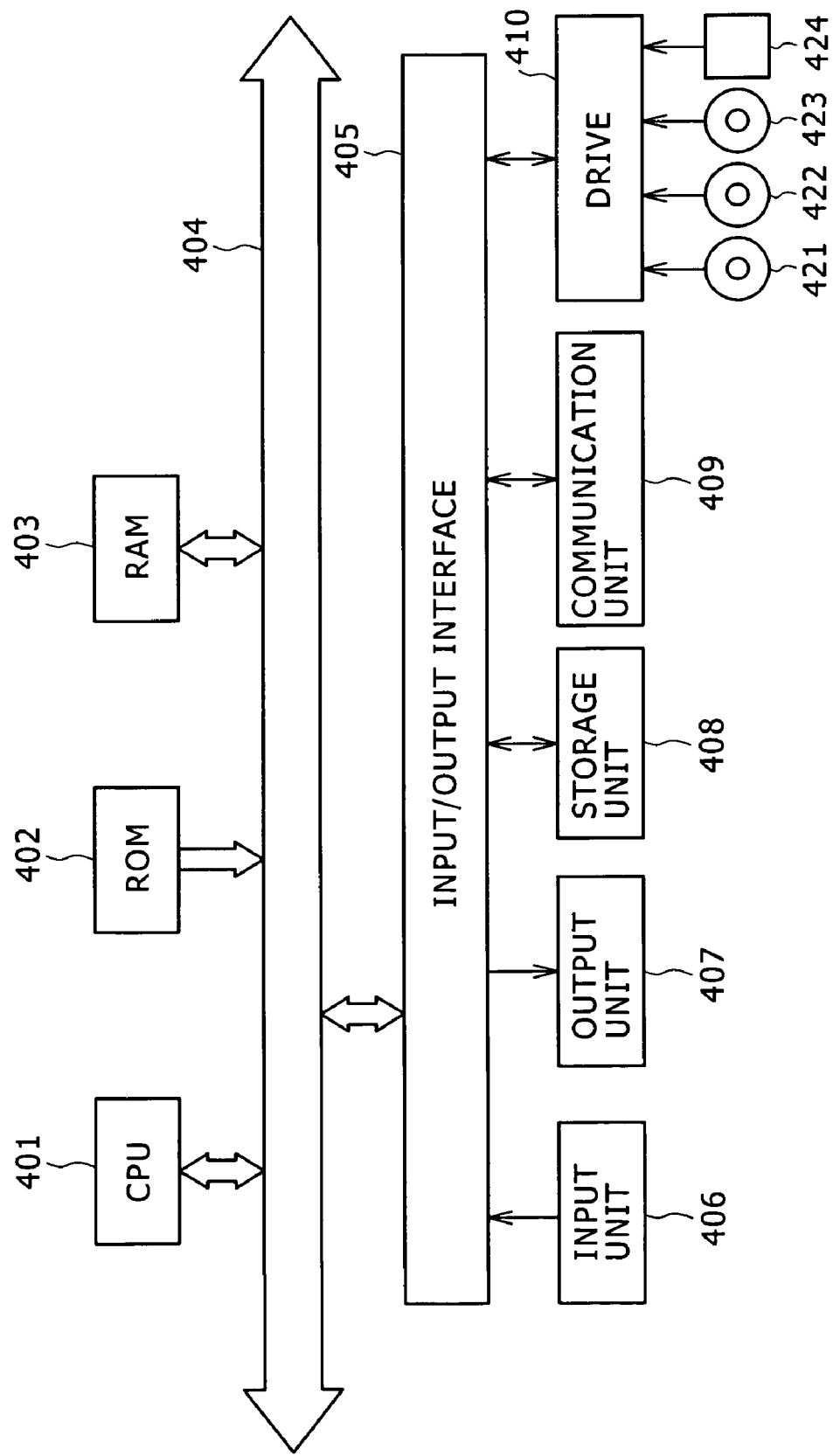

IMAGING DEVICE, IMAGE PROCESSING METHOD, IMAGE PROCESSING PROGRAM, AND RECORDING MEDIUM

CROSS-REFERENCE TO RELATED APPLICATIONS

The present application claims priority from Japanese Patent Application No. JP 2005-187702 filed on Jun. 28, 2005, the disclosure of which is hereby incorporated by reference herein.

BACKGROUND OF THE INVENTION

The present invention relates to an imaging device, a method, a program, and a recording medium. More specifically, the invention relates to an imaging device, a method, a program, and a recording medium for capturing moving images and still images.

In recent years, there is an increasing use of an imaging device capable of capturing an object and recording its image as a moving image and a still image at the same time. When recording a moving image, such imaging device uses its viewfinder to display the captured moving image.

When a moving image is recorded and an instruction is issued to record a still image, the imaging device allows the viewfinder to display an image of a shutter curtain on the instant. Further, the imaging device displays the still image recorded on the viewfinder for a specified period of time for the purpose of previewing.

This aims at allowing a user to confirm the instant of capturing the still image and the recorded still image.

While the viewfinder displays the shutter curtain image or the recorded still image, however, a moving image recorded in the meantime is not displayed. The user cannot confirm the moving image being recorded.

When an object is moving and becomes out of frame, the user cannot recognize the situation. As a result, the user may have inappropriately operated the imaging device and lost the object. There may be a case where a field angle for capturing a still image differs from a field angle for capturing a moving image. In such case, it is more difficult to record (capture) the still image and concurrently record (capture) the moving image by following the object.

In related art, a still image recording switch is constructed in two steps. Half pressing the switch captures a still image signal into memory and displays the captured still image signal on a viewfinder. Fully pressing the switch records the still image captured in the memory onto tape (e.g., see JP-A-292444/1993).

SUMMARY OF THE INVENTION

According to the invention described in patent document 1, releasing the half pressed still image recording switch resumes the display of the moving image. While the switch is half pressed, no moving image can be monitored either.

As described in the JP-A-292444/1993, the so-called picture-in-picture feature is used to display one of the moving image and the still image on the entire viewfinder and display the other as a small image on part of the viewfinder. The small image makes it difficult to confirm details of the image. Enlarging the small image makes it difficult to confirm the image displayed on the entire viewfinder.

When a moving image and a still image are captured concurrently, there is a need for capturing the moving image by following an object.

According to an embodiment of the invention, there is provided an imaging device including: imaging means for capturing an image; moving image data generation means for generating moving image data as image data for a moving image from an image captured by the imaging means; still image data generation means for, when the moving image data generation means generates the moving image data, generating still image data as image data for a still image from an image captured by the imaging means; and display data generation means for, when the moving image data is generated, generating first display data for displaying an image corresponding to the moving image data and, when the still image data is generated, generating second display data for displaying an image representing generation of the still image data in parallel with generation of the first display data.

According to the embodiment of the invention, an image is captured and moving image data is generated as image data for a moving image from the captured image. When the moving image data is generated, still image data is generated as image data for a still image from the captured image. When the moving image data is generated, first display data is generated so as to display an image corresponding to the moving image data. When the still image data is generated, the first display data is generated and concurrently second display data is generated so as to display an image representing generation of the still image data.

It is possible to further provide: first display means for displaying an image corresponding to the moving image data based on the first display data; and second display means for displaying generation of the still image data based on the second display data.

It is possible to further provide display means for displaying an image corresponding to the moving image data based on the first display data and displaying an image displaying generation of the still image data based on the second display data.

It is possible to further provide: selection means for selecting a display mode as a state of displaying a specified image corresponding to the moving image data or the still image data; and display control means for providing the display means with control over display of an image corresponding to the moving image data or the still image data based on the first display data or the second display data correspondingly to the selected display mode.

It is possible to further provide movement amount detection means for detecting a movement amount of the moving image. The selection means can select the display mode based on a detected movement amount.

The display data generation means can generate the second display data for displaying a shutter curtain image.

The display data generation means can generate the second display data from the still image data.

The display data generation means can generate the second display data for displaying an icon representing generation of the still image data.

It is possible to further provide: synthesis means for synthesizing the first display data and the second display data into third display data; and display control means for controlling image display based on the third display data.

It is possible to further provide selection means for selecting a display mode as a state of displaying a specified image corresponding to the moving image data or the still image data. The synthesis means can synthesize the first display data and the second display data into the third display data correspondingly to the selected display mode.

The display data generation means can generate the second display data for displaying a semi-transmissive image. The synthesis means synthesizes the first display data and the second display data for displaying a semi-transmissive image into the third display data.

It is possible to further provide movement amount detection means for detecting a movement amount of the moving image. The display data generation means can generate the second display data for displaying a semi-transmissive image having transmittance corresponding to a detected movement amount.

As mentioned above, according to the embodiment of the invention, it is possible to capture a moving image by following an object.

According to the embodiment of the invention, it is possible to capture a moving image by following an object when a moving image and a still image are captured simultaneously.

BRIEF DESCRIPTION OF THE DRAWINGS

Embodiments of the present invention will be described in detail based on the following figures, wherein:

FIG. 24 is a block diagram exemplifying the construction of a personal computer.

DETAILED DESCRIPTION

Embodiments of the present invention will be described below. The following shows an example of relationship between constituent features described in the appended claims and examples in the embodiments of the invention. This description aims at ensuring that the embodiments of the invention describe examples for supporting the invention described in the claims. Accordingly, an example may be described in the embodiments of the invention but may not be described as the one relevant to the constituent feature. This does not signify that the example is irrelevant to the constituent feature. By contrast, when the example is described as the one relevant to the constituent feature, it does not signify that the example is irrelevant to the other constituent features than that constituent feature.

Further, the description does not signify that the appended claims completely cover the invention corresponding to the examples described in the embodiments of the invention. In other words, the description concerns the invention corresponding to the examples described in the embodiments of the invention. The description does not deny the presence the invention not described in the claims of this application, i.e., the presence of the invention that may be disclosed as a divisional application or may be supplemented by correction in the future.

Figure 7:
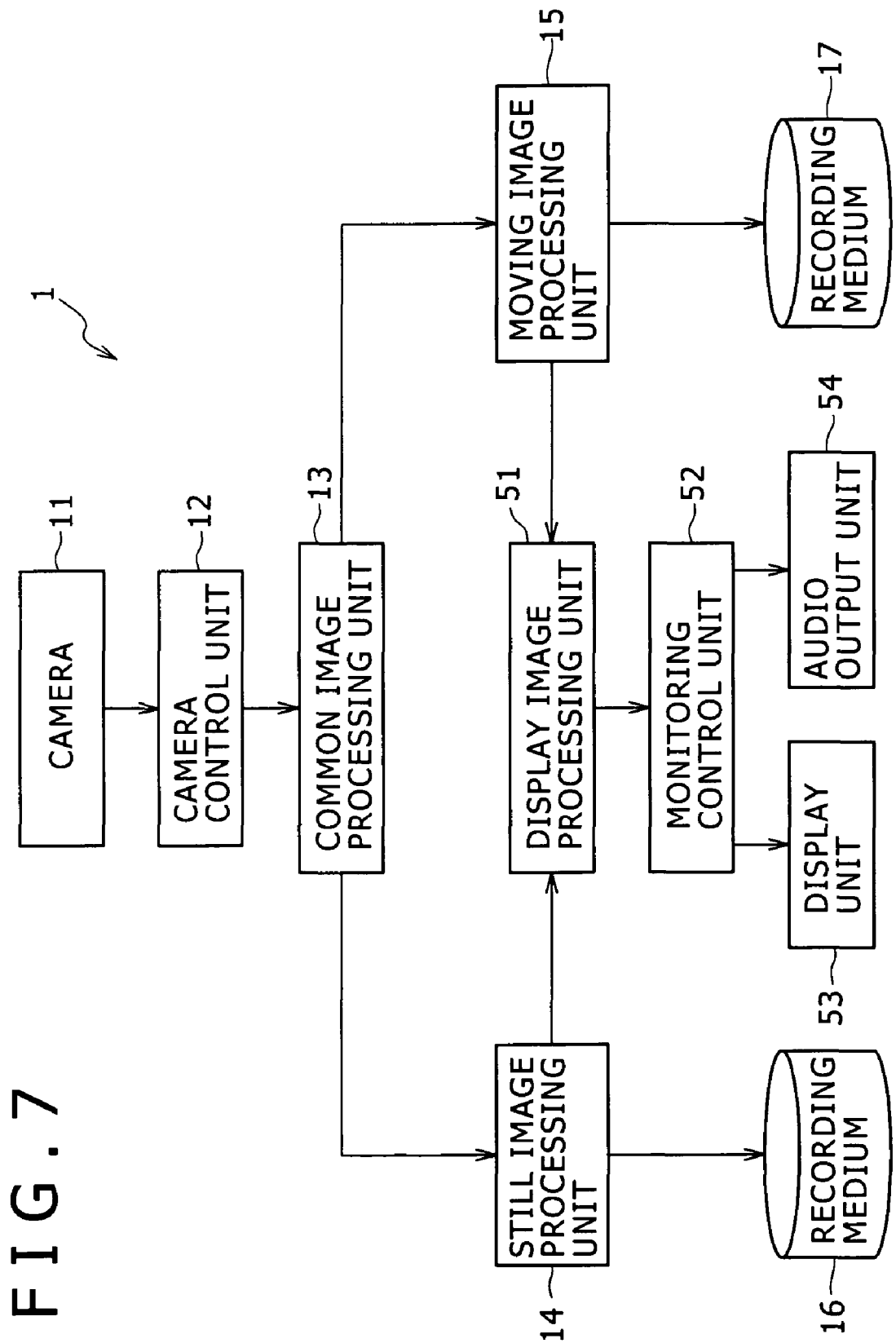
FIG. 7 is a block diagram showing another construction of the imaging device according to an embodiment of the invention.

An imaging device according to an embodiment of the invention includes: imaging means for capturing an image (e.g., a camera 11 in FIG. 7); moving image data generation means for generating moving image data as image data for a moving image from an image captured by the imaging means (e.g. a moving image processing unit 15 in FIG. 7); still image data generation means for, when the moving image data generation means generates the moving image data, generating still image data as image data for a still image from an image captured by the imaging means (e.g., a still image processing unit 14 in FIG. 7); and display data generation means for, when the moving image data is generated, generating first display data for displaying an image corresponding to the moving image data and, when the still image data is generated, generating second display data for displaying an image representing generation of the still image data in parallel with generation of the first display data (e.g., a display image processing unit 51 in FIG. 7).

Figure 19:
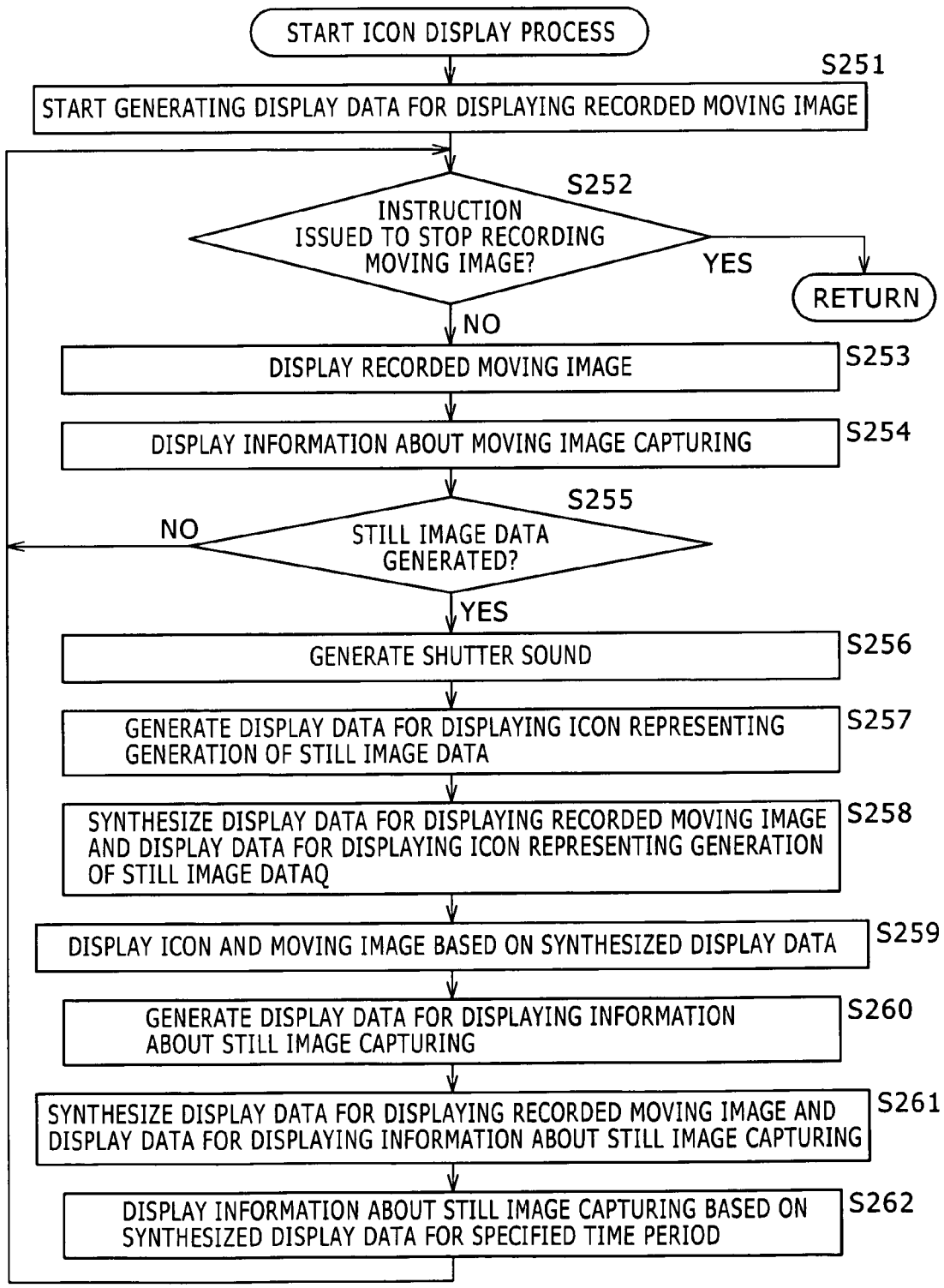
FIG. 19 is a flowchart showing a process to display an icon.

A image processing method according to another embodiment of the invention for an imaging device having imaging means (e.g., a camera 11 in FIG. 7) for capturing an image includes the steps of: generating moving image data as image data for a moving image from an image captured by the imaging means (e.g., Step S12 in FIG. 2); when the moving image data generation step generates the moving image data, generating still image data as image data for a still image from an image captured by the imaging means (e.g., Step S16 in FIG. 2); when the moving image data is generated, generating first display data for displaying an image corresponding to the moving image data (e.g., Step S251 in FIG. 19); and when the still image data is generated, generating second display data for displaying an image representing generation of the still image data in parallel with generation of the first display data (e.g., Step S257 in FIG. 19).

Figure 1:
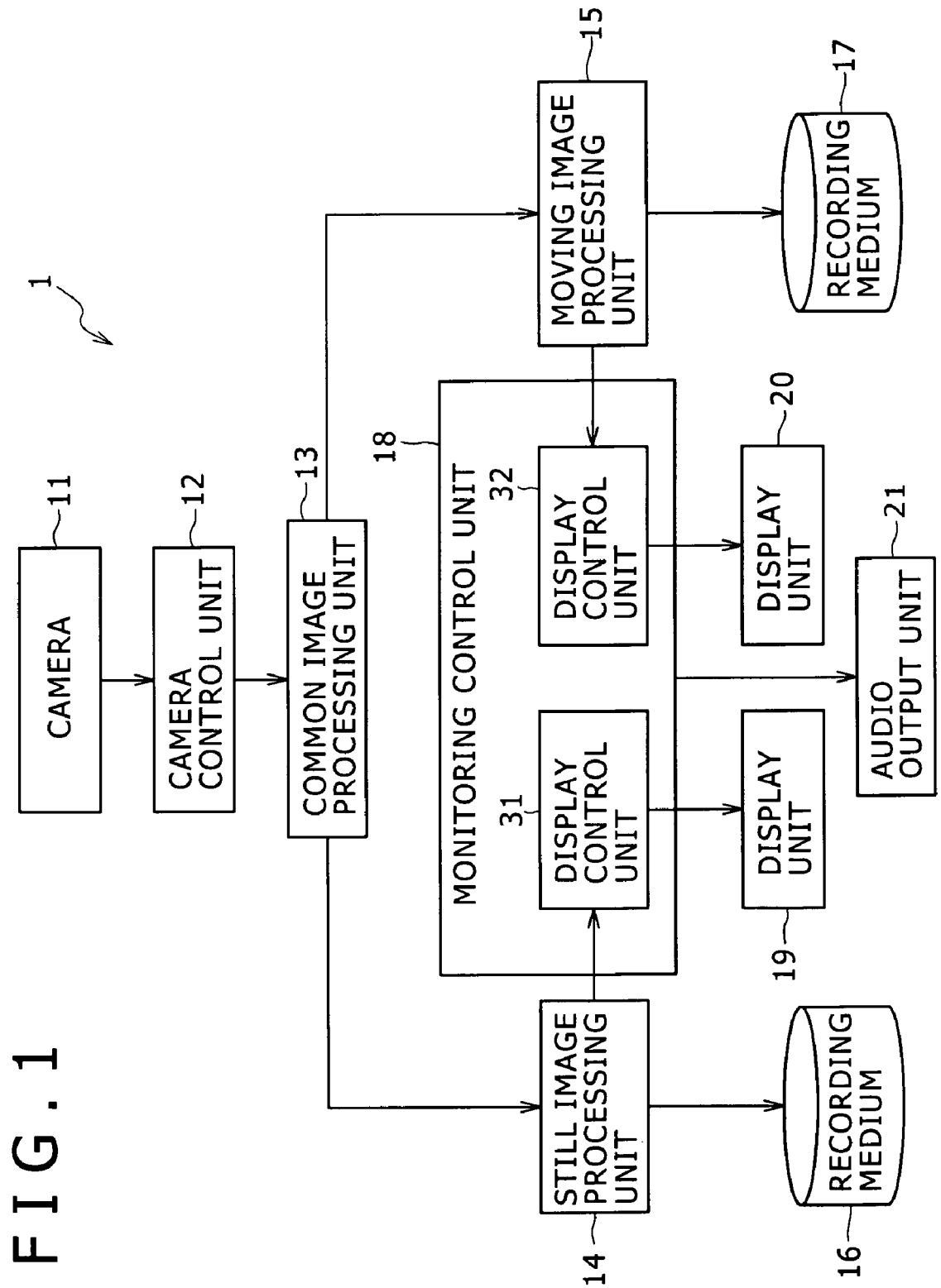
FIG. 1 is a block diagram showing the construction of the imaging device according to an embodiment of the invention.

FIG. 1 is a block diagram showing the construction of the imaging device according to an embodiment of the invention. An imaging device 1 represents a digital camera or a digital video camera and captures images and records moving images and still images. The imaging device 1 includes: a camera 11; a camera control unit 12; a common image processing unit 13; a still image processing unit 14; a moving image processing unit 15; a recording medium 16; a recording medium 17; a monitoring control unit 18; a display unit 19; a display unit 20; and an audio output unit 21.

The camera 11 is composed of: a photoelectric conversion element such as a CCD (Charge Coupled Device) or CMOS (Complementary Metal-Oxide Semiconductor) sensor for converting images into electric signals; and an optical system that forms an object image on the photoelectric conversion element. The camera 11 converts the object image into an image signal, i.e., an electric signal. That is, the camera 11 captures the object. The camera supplies the camera control unit 12 with the image signal resulting from imaging.

The camera control unit 12 controls photographic conditions of the camera 11 such as zooming, focusing, stopping, and shutter speeds. The camera control unit 12 supplies the common image processing unit 13 with an image signal supplied from the camera 11 as a result of capturing. The camera control unit 12 supplies the common image processing unit 13 with data indicating the photographic condition such as zooming, focusing, stopping, or shutter speeds.

The common image processing unit 13 applies such process as noise reduction, distortion correction, or white balancing to the image signal resulting from the capturing. The common image processing unit 13 supplies the processed image signal to the still image processing unit 14 and the moving image processing unit 15. Further, the common image processing unit 13 supplies the still image processing unit 14 and the moving image processing unit 15 with data indicating the photographic condition such as zooming, focusing, stopping, or shutter speeds. In addition, the common image processing unit 13 supplies the still image processing unit 14 and the moving image processing unit 15 with data concerning the white balance applied to the image signal by the common image processing unit 13.

The common image 13 supplies the still image processing unit 14 and the moving image processing unit 15 with image signals whose field angles, image sizes, or resolutions may or may not the same.

When image signals are supplied from the common image processing unit 13, the still image processing unit 14 applies a process for still image compression coding such as JPEG (Joint Photographic Experts Group) coding to the image signal corresponding to one still image. The still image processing unit 14 generates still image data from the image signal so as to display a still image. The still image processing unit 14 supplies the generated still image data to the recording medium 16.

The system for generated still image data may comply with not only JPEG, but also the other systems such as JPEG2000.

The still image processing unit 14 supplies the monitoring control unit 18 with the image signal supplied from the common image processing unit 13. Further, the still image processing unit 14 supplies the monitoring control unit 18 with the image signal resulting from decoding the generated still image data. Moreover, the still image processing unit 14 supplies the monitoring control unit 18 with data indicating the photographic condition such as zooming, focusing, stopping, shutter speeds, or ISO speeds concerning the image signal that is applied with the process (compression coding process) to generate still image data. Alternatively, the still image processing unit 14 supplies the monitoring control unit 18 with data concerning the process applied to the image signal by the common image processing unit 13.

For example, the moving image processing unit 15 applies a process for moving image compression coding such as MPEG (Moving Pictures Experts Group) coding to the image signal supplied from the common image processing unit 13. In this manner, the moving image processing unit 15 generates moving image data from the image signal so as to display a moving image. The moving image processing unit 15 supplies the generated moving image data to the recording medium 17.

The system for generated moving image data may comply with not only the MPEG system such as MPEG1, MPEG2, MPEG4, or MPEG7, but also the other systems.

The moving image processing unit 15 supplies the monitoring control unit 18 with the image signal (original image signal before the compression coding) applied with a process (compression coding process) to generate moving image data. Furthermore, the moving image processing unit 15 supplies the monitoring control unit 18 with data indicating photographic conditions concerning the image signal applied with the moving image data generation process (compression coding process). Alternatively, the moving image processing unit 15 supplies the monitoring control unit 18 with data concerning the process applied to the image signal by the common image processing unit 13.

The recording medium 16 is composed of a hard disk, an optical disk driven by a specified drive, or semiconductor memory and records still image data supplied from the still image processing unit 14.

The recording medium 17 is composed of a hard disk, an optical disk driven by a specified drive, or semiconductor memory and records moving image data supplied from the moving image processing unit 15.

A single recording medium may be used to record still image data and moving image data.

The monitoring control unit 18 generates display data for generating an image that shows generation of still image data. For example, the monitoring control unit 18 generates display data for displaying an image that simulates the shutter curtain. Further, the monitoring control unit 18 generates display data for displaying an image that is a reduced version of an image displayed by still image data.

Moreover, the monitoring control unit 18 generates display data for displaying an image corresponding to moving image data. For example, the monitoring control unit 18 generates display data for displaying an image that is a reduced version of an image displayed by moving image data.

The monitoring control unit 18 includes a display control unit 31 and a display control unit 32. The display control unit 31 uses the image signal supplied from the still image processing unit 14 or prestored data to generate display data for displaying the object image captured by the camera 11 or display data for displaying generation of still image data. The display control unit 31 uses the photographic condition data supplied from the still image processing unit 14 to generate display data for displaying information about the still image capturing. The display control unit 31 supplies the generated display data to the display unit 19.

The display control unit 32 uses the image signal supplied from the moving image processing unit 15 to generate display data for displaying an image corresponding to the moving image data. The display control unit 32 uses the photographic condition data supplied from the moving image processing unit 15 or prestored data to generate display data for displaying information about the moving image capturing. The display control unit 32 supplies the generated display data to the display unit 20.

The display unit 19 uses the display data supplied from the monitoring control unit 18 to display the object image captured by the camera 11 or to display an image showing generation of the still image data.

The display unit 20 uses the display data supplied from the monitoring control unit 18 to display an image corresponding to the moving image data or to display the information about the moving image capturing. For example, the display unit 19 or 20 is equivalent to an electric viewfinder provided with a display device such as an LCD (Liquid Crystal Display) or an organic EL (Electro Luminescence) display.

The still image processing unit 14 may generate still image data. In this case, the monitoring control unit 18 uses a signal from the still image processing unit to allow the audio output unit 21 to output a sound simulating the shutter sound or a buzzer sound. The audio output unit 21 is composed of a speaker or a buzzer.

Figure 2:
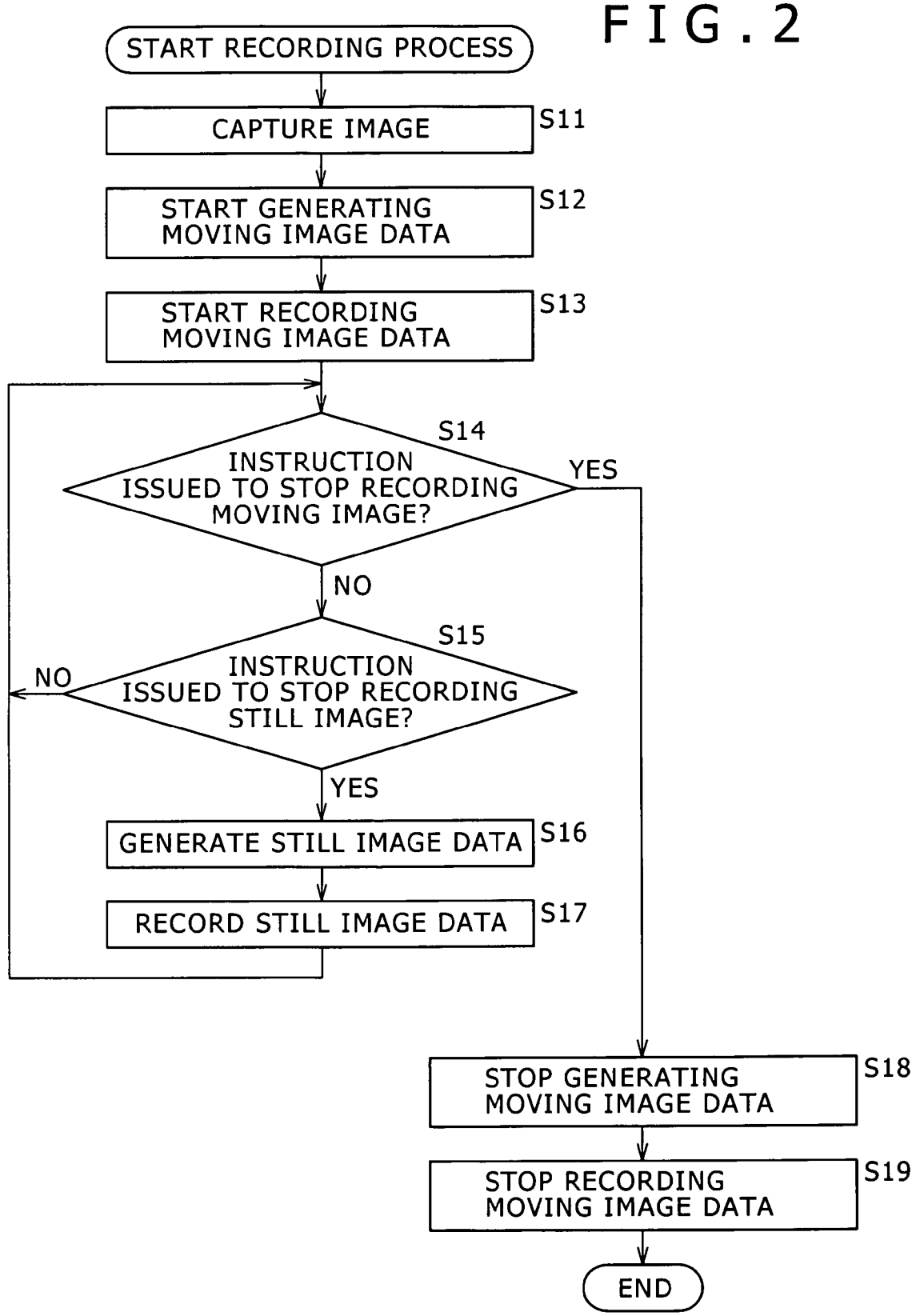
FIG. 2 is a flowchart showing a recording process.

FIG. 2 is a flowchart showing a recording process in the imaging device 1. The process is performed when an instruction is issued to start recording moving image data. At Step S11, the camera control unit 12 allows the camera 11 to capture an image. In this manner, the camera 11 captures the image (object). In other words, the camera 11 converts the object's image into an image signal as an electric signal. The camera 11 supplies the image signal resulting from the capturing to the still image processing unit 14 and the moving image processing unit 15 via the camera control unit 12 and the common image processing unit 13.

At Step S12, the moving image processing unit 15 starts applying a specified process to the image signal supplied from the common image processing unit 13 to start generating moving image data. The moving image processing unit 15 supplies the generated moving image data to the recording medium 17. At Step S13, the recording medium 17 starts recording the moving image data supplied from the moving image processing unit 15. At Step S13, for example, the drive starts driving the recording medium 17 as an optical disk to start recording the moving image data supplied from the moving image processing unit 15 on the recording medium 17.

At Step S14, the camera control unit 12 uses a signal from a switch (not shown) operated by a user to determine whether or not an instruction is issued to stop recording the moving image. When it is determined that no instruction is issued to stop recording the moving image, the camera control unit 12 proceeds to Step S15. The camera control unit 12 uses a signal from a shutter button (not shown) or the like operated by the user to determine whether or not the shutter button is pressed to issue an instruction to record a still image.

When it is determined at Step S15 that an instruction is issued to record the still image, the process proceeds to Step S16. The still image processing unit 14 applies a specified process to the image signal supplied from the common image processing unit 13 to generate still image data. The still image processing unit 14 supplies the generated still image data to n the recording medium 16. At Step S17, the recording medium 16 records the still image data supplied from the still image processing unit 14. At Step S17, for example, the recording medium 16 as semiconductor memory records the still image data.

After Step S17, the process returns to Step S14 and repeats the above-mentioned steps.

When it is determined at Step S15 that no instruction is issued to record the still image, there is no need for recording the still image. The process skips Steps S16 and S17, returns to Step S14, and repeats the above-mentioned steps.

When it is determined at Step S14 that an instruction is issued to stop recording the moving image, the moving image processing unit 15 stops recording the moving image data. At Step S19, the recording medium 17 stops recording the moving image data supplied from the moving image processing unit 15. The process then terminates.

In this manner, still image data is recorded while moving image data is recorded.

Figure 3:
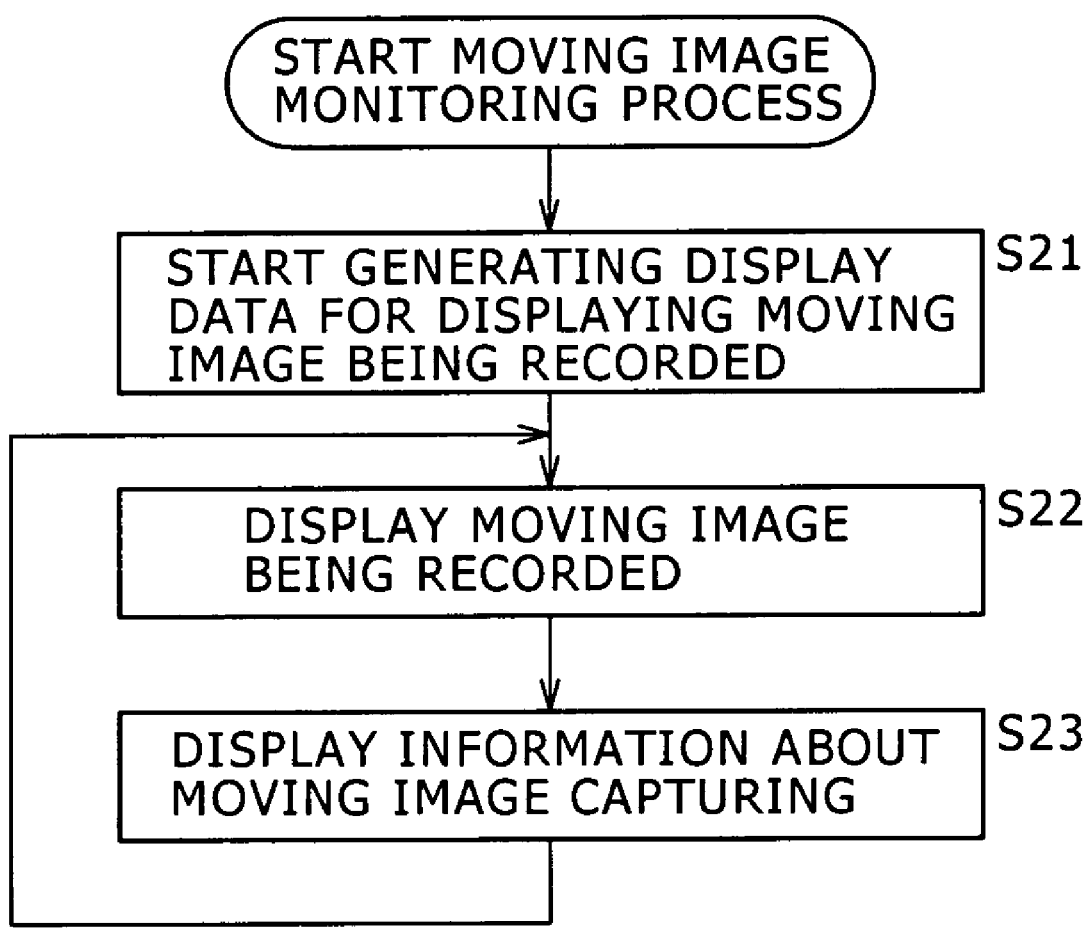
FIG. 3 is a flowchart showing a process to monitor a moving image.

Referring now to the flowchart in FIG. 3, the following describes a moving image monitoring process. At Step S21, the display control unit 32 of the monitoring control unit 18 uses an image signal supplied from the moving image processing unit 15 to start generating display data for displaying the recorded moving image (moving image corresponding to the moving image to be displayed by the recorded moving image data). That is, the display control unit 32 starts generating display data for displaying an image corresponding to the moving image data. The display control unit 32 uses data indicating the photographic conditions supplied from the moving image processing unit 15 to generate display data for displaying information about moving image capturing. For example, the information concerns a time counter indicating the time elapsed from the beginning of recording (capturing), the free capacity of the recording medium 17, and the time capable of capturing a moving image corresponding to the power charged in a battery (not shown).

At Step S22, the display control unit 32 supplies the display unit 20 with display data for displaying the recorded moving image. The display control unit 32 allows the display unit 20 to display the recorded moving image.

Figure 4:
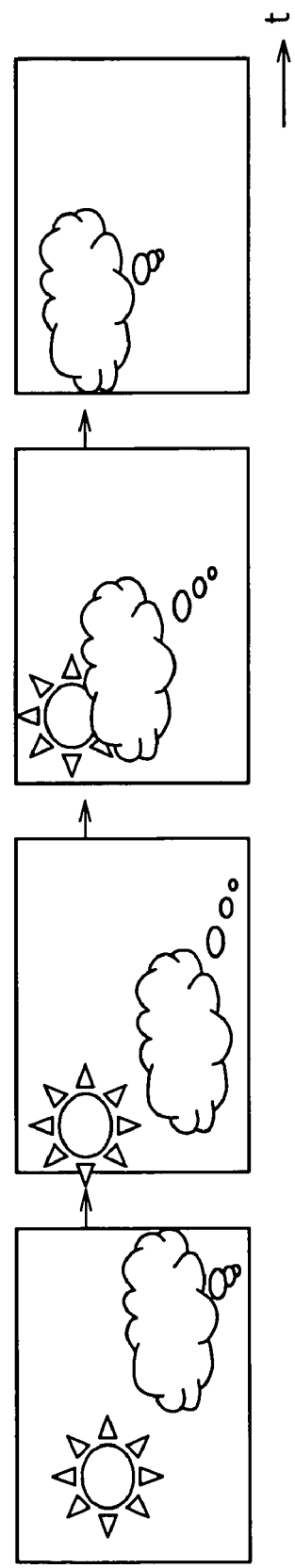
FIG. 4 exemplifies images displayed on a display unit.

As shown in FIG. 4, the display unit 20 can continuously display the recorded moving image.

At Step S23, the display control unit 32 supplies the display unit 20 with display data for displaying the information about moving image capturing. In this manner, the display control unit 32 allows the display unit 20 to display the information about moving image capturing. The process returns to Step S22 and repeats the above-mentioned steps.

The process described by the flowchart in FIG. 3 terminates when the moving image data recording ends.

Figure 5:
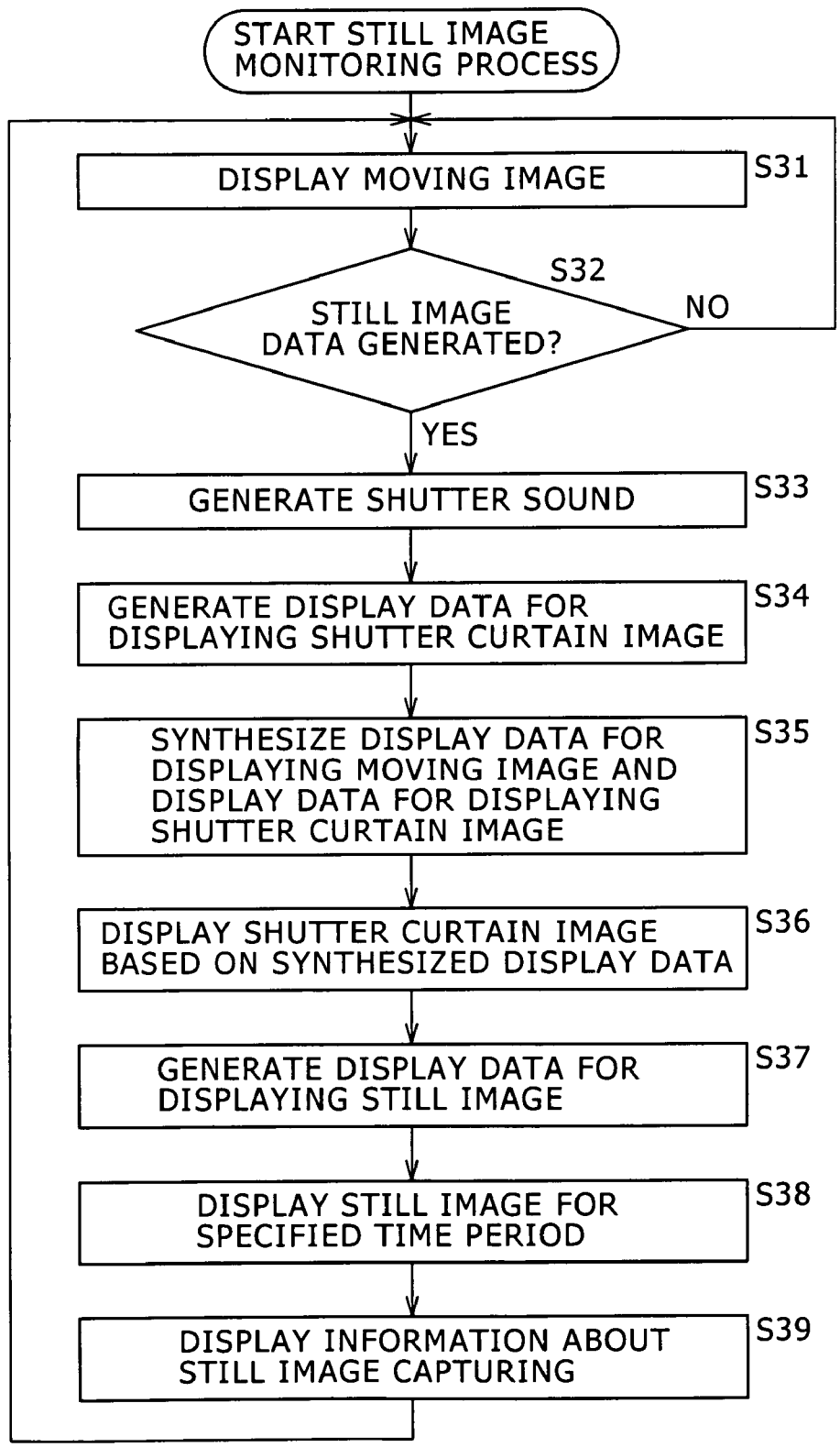
FIG. 5 is a flowchart showing a process to monitor a still image.

Referring now to the flowchart in FIG. 5, the following describes a still image monitoring process. At Step S31, the display control unit 31 of the monitoring control unit 18 uses the image signal supplied from the still image processing unit 14 to supply the display unit 19 with display data for displaying an object's image captured by the camera 11. In this manner, the display control unit 31 allows the display unit 19 to display the moving image.

Figure 6:
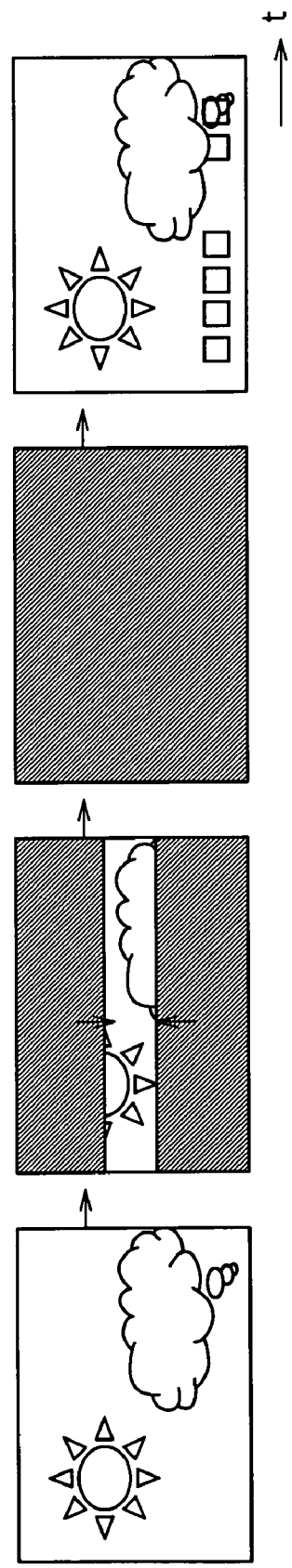
FIG. 6 exemplifies images displayed on the display unit.

As shown at the left of FIG. 6, the display unit 19 displays the object's moving image.

In this case, the display unit 19 may display the information about the still image recording such as the number of pieces of still image data that can be recorded.

At Step S32, the display control unit 31 uses a signal supplied from the still image processing unit 14 to determine whether or not the still image processing unit 14 generates still image data. When it is determined at Step S32 that still image data is generated, the process proceeds to Step S33. The monitoring control unit 18 allows the audio output unit 21 to generate a shutter sound.

At Step S34, the display control unit 31 uses prestored data to generate display data for displaying a shutter curtain image (an image simulating the shutter curtain). At Step S35, the display control unit 31 synthesizes the display data for displaying the moving image and for displaying the shutter curtain image. The display data for displaying the moving image is generated from the image signal supplied from the still image processing unit 14 and is used for displaying the object's image captured by the camera 11.

At Step S36, the display control unit 31 uses the synthesized display data to allow the display unit 19 to display the shutter curtain image' synthesized with the moving image.

When the still image processing unit 14 generates still image data, the display unit 19 displays images simulating that the shutter curtain obstructs the moving image to represent the instant of capturing (recording) the still image. The second and third diagrams from the left of FIG. 6 illustrate this situation.

At Step S7, the display control unit 31 uses the image signal to generate display data for displaying the still image corresponding to the generated still image. The image signal is supplied from the still image processing unit 14 and results from decoding the generated still image data.

At Step S38, the display control unit 31 supplies the display unit 19 with display data for displaying the still image to allow the display unit 19 to display the still image for a specified time period.

At Step S39, the display control unit 31 is supplied with the image signal from the still image processing unit 14. This image signal is applied with the process (compression coding process) to generate still image data. The display control unit 31 uses data indicating photographic conditions concerning the image signal to generate display data for displaying the information concerning the still image capturing. The display control unit 31 allows the display unit 19 to display the information about still image capturing. The process returns to Step S31 and repeats the above-mentioned steps.

After the shutter curtain image is displayed, for example, the display unit 19 displays not only the still image corresponding to the generated still image data, but also the information about the still image capturing. The right end diagram in FIG. 6 illustrates this situation.

When it is determined at Step S32 that no still image data is generated, there is no need for displaying an image concerning the still image data. The process returns to Step S31 and is repeated to display a moving image.

In this manner, the display unit 19 displays the image indicating generation of the still image data, the image needed for still image capturing, and the information about still image capturing. Meantime, the display unit 20 continuously displays a recorded moving image.

As a result, when a moving image and a still image are captured simultaneously, the moving image can be captured by following the object.

A preview display is used to confirm a still image displayed by the recorded still image data or display a histogram for confirming the contents of still image data. Only the display unit 19 provides the preview display.

When one display unit is provided to simultaneously display a moving image and a still image, the following describes an imaging device that can capture the moving image by following an object.

FIG. 7 is a block diagram showing another construction of the imaging device according to an embodiment of the invention. The mutually corresponding parts in FIGS. 7 and 1 are designated by the same reference numerals and a detailed description is omitted as needed.

The still image processing unit 14 supplies a display image processing unit 51 with an image signal resulting from decoding the generated still image data. Further, the still image processing unit 14 supplies the display image processing unit 51 with data indicating the photographic condition such as zooming, focusing, stopping, shutter speeds, or ISO speeds concerning the image signal that is applied with the process (compression coding process) for generating still image data. Alternatively, the still image processing unit 14 supplies the display image processing unit 51 with data concerning a process applied to the image signal in the common image processing unit 13.

The moving image processing unit 15 supplies the display image processing unit 51 with the image signal (original image signal before the compression coding) applied with a process (compression coding process) to generate moving image data. Furthermore, the moving image processing unit 15 supplies the display image processing unit 51 with data indicating photographic conditions concerning the image signal applied with the moving image data generation process (compression coding process). Alternatively, the moving image processing unit 15 supplies the display image processing unit 51 with data concerning the process applied to the image signal by the common image processing unit 13.

The display image processing unit 51 uses the data supplied from the still image processing unit 14 or the moving image processing unit 15 to generate display data for displaying an image indicating still image data generation and display data for displaying an image corresponding to the moving image data. The display image processing unit 51 supplies the generated display data to a monitoring control unit 52.

The monitoring control unit 52 supplies the display unit 53 with the display data supplied from the display image processing unit 51, thus allowing the display unit 53 to display an image indicating the still image data generation or an image corresponding to the moving image data.

The display unit 53 uses the display data supplied from the monitoring control unit 52 to display the image indicating the still image data generation or the image corresponding to the moving image data. The display unit 53 is equivalent to a so-called electric viewfinder provided with a display device such as an LCD or an organic EL display, for example.

An audio output unit 54 is composed of a speaker or a buzzer. Under control of the monitoring control unit 52, the audio output unit 54 generates the sound such as a shutter sound to notify a user that the still image data is generated.

Figure 8:
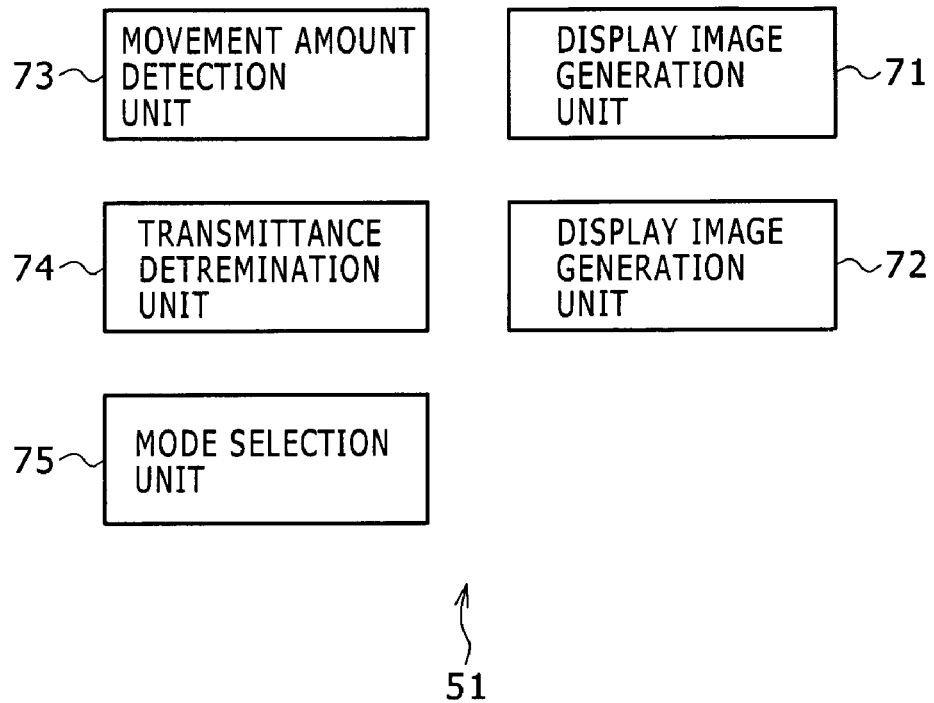
FIG. 8 is a block diagram exemplifying the construction of a display image processing unit.

FIG. 8 is a block diagram exemplifying the construction of the display image processing unit 51. An image signal results from decoding prestored data or still image data supplied from the still image processing unit 14. A display image generation unit 71 uses that image signal to generate display data for displaying an image showing still image data generation. The display image generation unit 71 uses data indicating the photographic condition such as zooming, focusing, stopping, shutter speeds, or ISO speeds concerning the image signal applied with the process (compression coding process) for generating still image data to generate display data for displaying information about the still image capturing.

The moving image processing unit 15 supplies the display image generation unit 72 with an image signal applied with a process (compression coding process) to generate moving image data. The display image generation unit 72 uses that image signal to generate display data for displaying an image corresponding to the moving image data. Again, the moving image processing unit 15 supplies the display image generation unit 72 with an image signal applied with a process (compression coding process) to generate moving image data. The display image generation unit 72 uses data showing the photographic condition about that image signal to generate display data for displaying the information about moving image capturing.

A movement amount detection unit 73 is supplied with an image signal from the still image processing unit 14 or the moving image processing unit 15. The movement amount detection unit 73 uses the image signal to detect the movement amount for the object's image captured by the camera 11. For example, the movement amount detection unit 73 uses the process such as the block matching or the gradient method to detect the movement amount for the object's image captured by the camera 11.

A transmittance determination unit 74 determines the transmittance of an image displayed by the display data generated from the display image generation unit 71 according to a user's selection or the detected movement amount. An image displayed by the display data generated by the display image generation unit 71 is rendered on a layer higher than an image displayed by the display data generated by the display image generation unit 72. Increasing the transmittance less clearly renders the image displayed by the display data generated by the display image generation unit 71 and more clearly renders the image displayed by the display data generated by the display image generation unit 72. Decreasing the transmittance more clearly renders the image displayed by the display data generated by the display image generation unit 71 and less clearly renders the image displayed by the display data generated by the display image generation unit 72.

A mode selection unit 75 selects a display mode according to a user's selection or the detected movement amount. The display mode specifies a state of displaying a specified image corresponding to the generated moving or still image.

Figure 9:
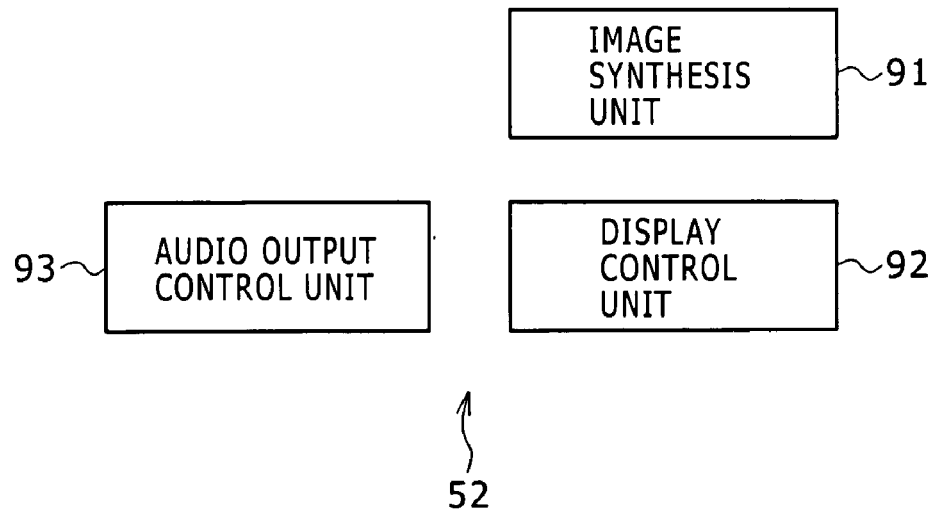
FIG. 9 is a block diagram exemplifying the construction of a monitoring control unit.

FIG. 9 is a block diagram exemplifying the construction of the monitoring control unit 52. An image synthesis unit 91 synthesizes two pieces of display data into one final display data. One is the display data generated by the display image generation unit 71 of the display image processing unit 51. The other is display data generated by the display image generation unit 72.

A display control unit 92 uses the synthesized display data to control display of images or information for the display unit 53. An audio output control unit 93 controls to allow the audio output unit 54 to generate audio.

The recording process of the imaging device as constructed in FIG. 7 is similar to that described with reference to the flowchart in FIG. 2 and a description is omitted for simplicity.

Figure 10:
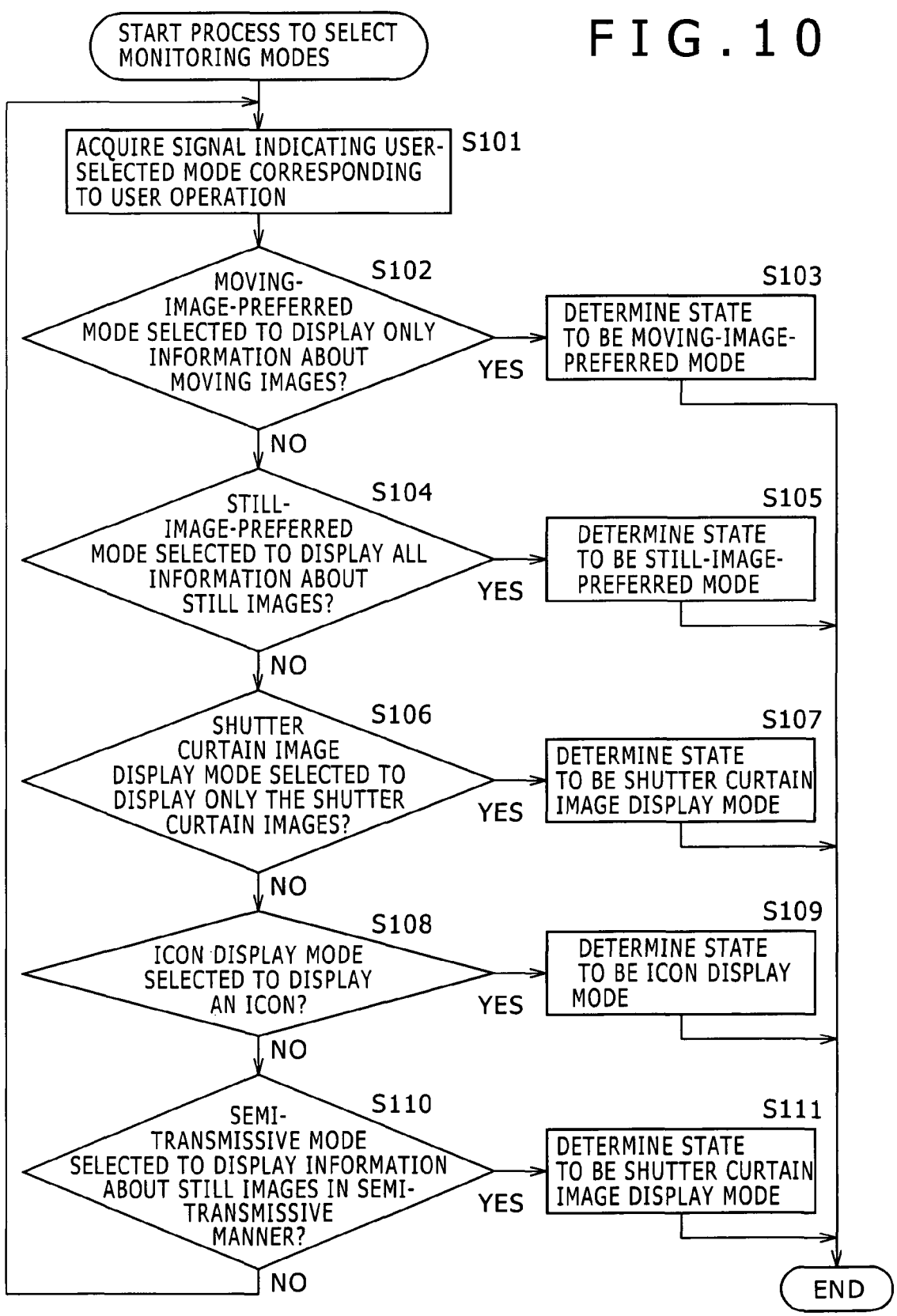
FIG. 10 is a flowchart showing a process to select monitoring modes.

FIG. 10 is a flowchart showing a process to select monitoring modes. At Step S101, the mode selection unit 75 of the display image processing unit 51 acquires a signal indicating the mode selected by a user. This signal is supplied from a button, a key, a switch, or a touch panel (not shown) in accordance with the user's operation. At Step S102, the mode selection unit 75 uses the signal indicating the selected mode to determine whether or not a moving-image-preferred mode is selected to display only the information about moving images. When it is determined that the moving-image-preferred mode is selected, the process proceeds to Step S103. The process determines the state to be the moving-image-preferred mode and then terminates.

When it is determined at Step S102 that the moving-image-preferred mode is not selected, the process proceeds to Step S104. The mode selection unit 75 uses the signal indicating the selected mode to determine whether or not a still-image-preferred mode is selected to display all the information about still images. When it is determined that the still-image-preferred mode is selected, the process proceeds to Step S105. At Step S105, the mode selection unit 75 determines the state to be the still-image-preferred mode. The process then terminates.

When it is determined at Step S104 that the still-image-preferred mode is not selected, the process proceeds to Step S106. The mode selection unit 75 uses the signal indicating the selected mode to determine whether or not a shutter curtain image display mode is selected to display only the shutter curtain image in the event of still image data generation. When it is determined that the shutter curtain image display mode is selected, the process proceeds to Step S107. At Step S107, the mode selection unit 75 determines the state to be the shutter curtain image display mode. The process then terminates.

When it is determined at Step S106 that the shutter curtain image display mode is not selected, the process proceeds to Step S108. The mode selection unit 75 uses the signal indicating the selected mode to determine whether or not an icon display mode is selected to display an icon showing the still image data generation in the event of still image data generation. When it is determined that the icon display mode is selected, the process proceeds to Step S109. At Step S109, the mode selection unit 75 determines the state, to be the icon display mode. The process then terminates.

When it is determined at Step S108 that the icon display mode is not selected, the process proceeds to Step S110. The mode selection unit 75 uses the signal indicating the selected mode to determine whether or not a semi-transmissive mode is selected to display the information about still images in a semi-transmissive manner. When it is determined that the semi-transmissive mode is selected the process proceeds to Step S111. At Step S107, the mode selection unit 75 determines the state to be the semi-transmissive mode. The process then terminates.

When it is determined at Step S110 that the semi-transmissive mode is not selected, no mode is selected. The process returns to Step S101 and is repeated thereafter.

In this manner, the process selects one of the moving-image-preferred mode, the still-image-preferred mode, the shutter curtain image display mode, the icon display mode, and the semi-transmissive display mode.

Figure 11:
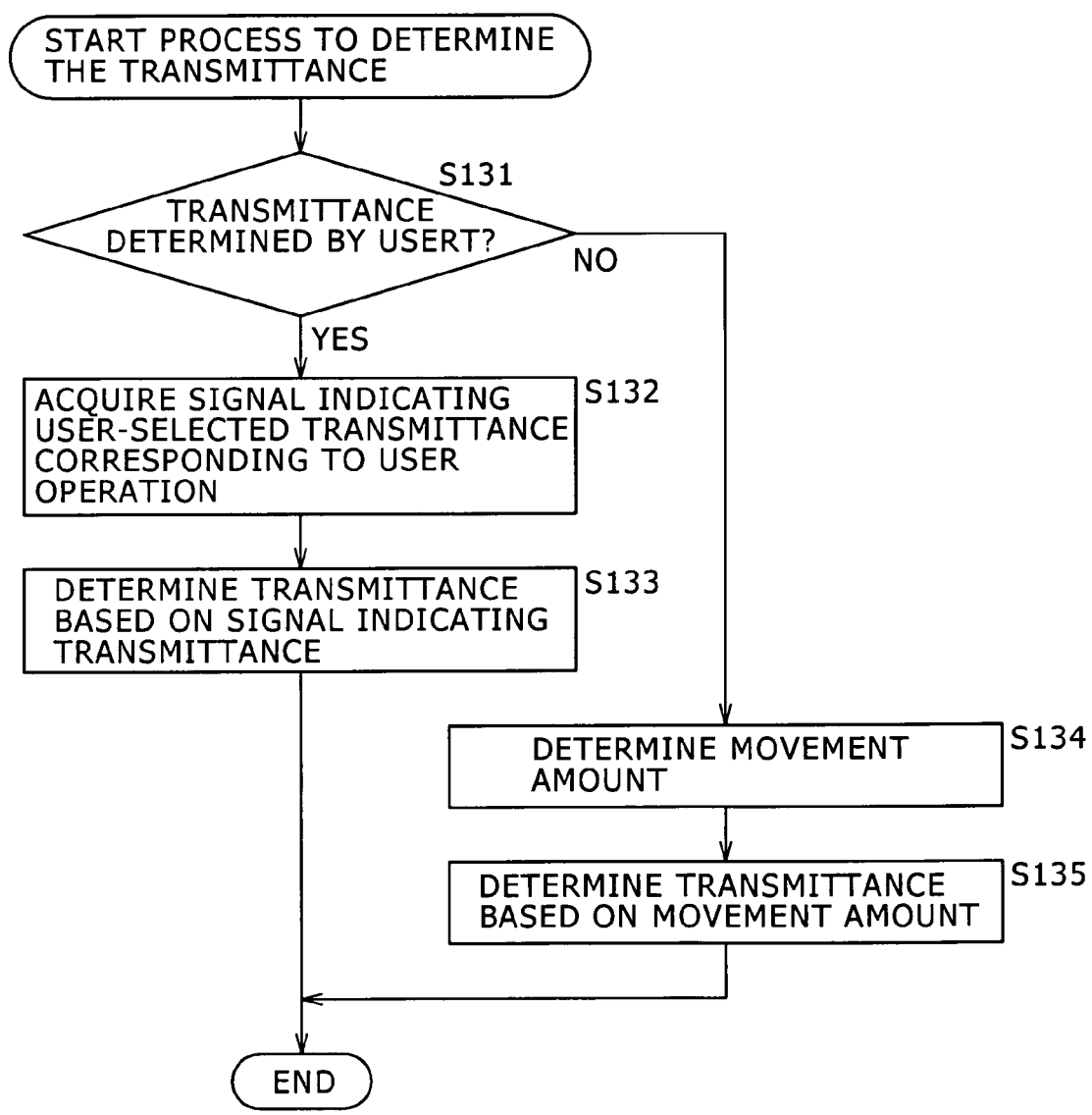
FIG. 11 is a flowchart showing a process to determine transmittance.

Referring now to the flowchart in FIG. 11, the following describes a process to determine the transmittance of the information about still images displayed in the semi-transmissive display mode. At Step S131, the transmittance determination unit 74 uses predetermined setting or user's selection to determine whether or not the user determines the transmittance. When it is determined that the user determines the transmittance, the process proceeds to Step S132. The transmittance determination unit 74 acquires a signal indicating the transmittance selected by the user. This signal is supplied from the button, the key, the switch, or the touch panel (not shown) in accordance with the user's operation. The signal can indicate the transmittance by means of numeric values equivalent to the ratio of transmittance or qualitative states such as being clear, slightly less clear, and less clear.

At Step S133, the transmittance determination unit 74 uses the signal indicating the transmittance to determine the quantitative transmittance 0 or 1 and stores the determined transmittance data. The process then terminates.

When it is determined at Step S131 that the user does not determine the transmittance, the process proceeds to Step S134. The transmittance determination unit 74 allows the movement amount detection unit 73 to detect the movement amount of the object's image captured by the camera 11 based on the image signal supplied from the still image processing unit 14 or the moving image processing unit 15. At Step S135, the transmittance determination unit 74 uses the detected movement amount to determine the quantitative transmittance and stores the determined transmittance data. The process then terminates.

In this case, a larger movement amount yields a larger transmittance so as to display the information about still images less clearly. A smaller movement amount yields a smaller transmittance so as to display the information about still images more clearly.

Accordingly, an object can be easily followed even when the movement amount is large. When there is a little need for following the object or the movement amount is small, it is possible to allow the user to reliably confirm the information about still images.

Figure 12:
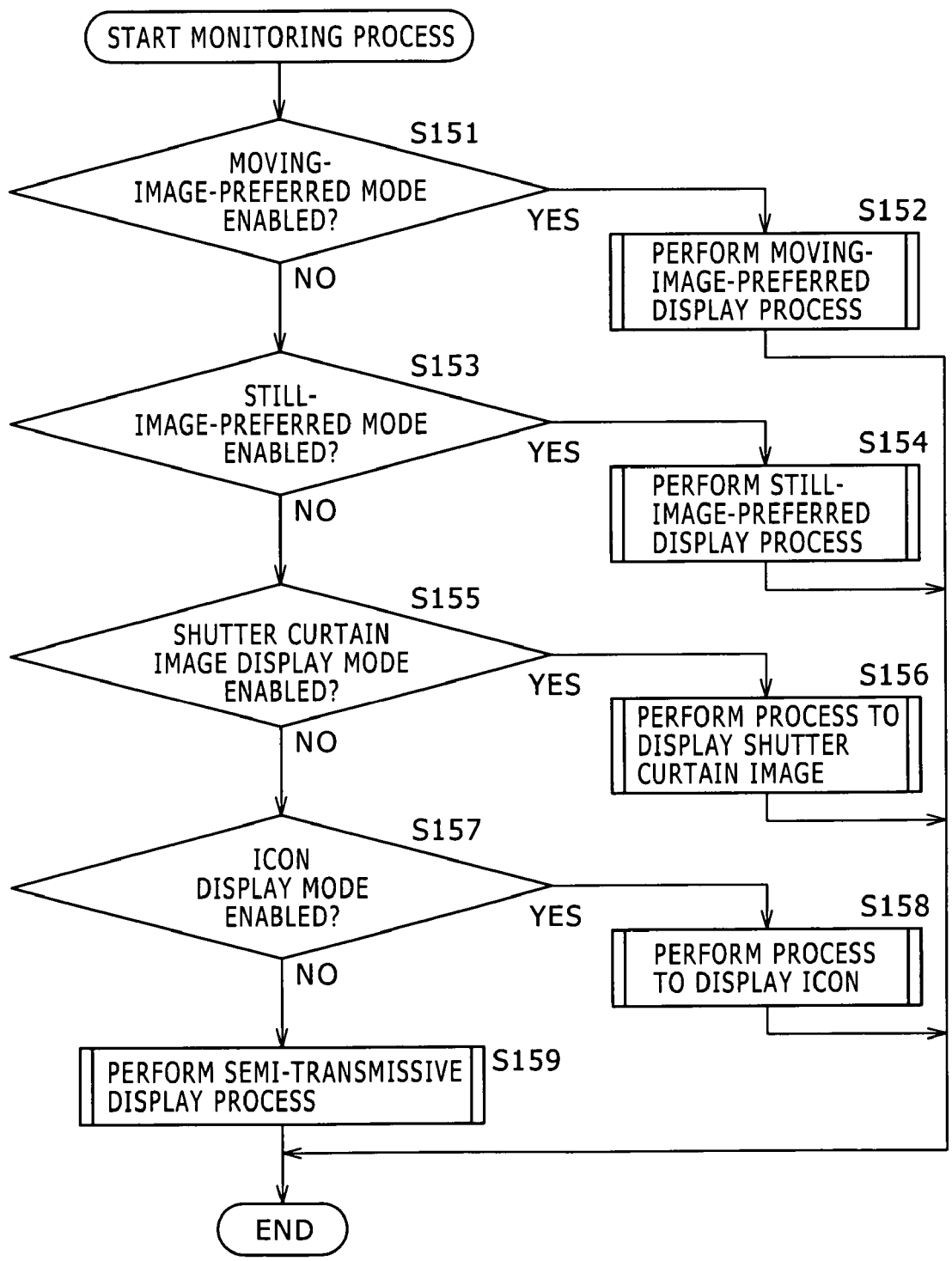
FIG. 12 is a flowchart showing a monitoring process.

Referring now to the flowchart in FIG. 12, the following describes a monitoring process. At Step S151, the display image processing unit 51 determines whether or not the moving-image-preferred mode is enabled. When it is determined that the moving-image-preferred mode is enabled, the process proceeds to Step S152. The display image processing unit 51 and the monitoring control unit 52 preferentially perform a moving-image-preferred display process. The process then terminates. The moving-image-preferred display process will be described later in detail.

When it is determined at Step S151 that the moving-image-preferred mode is not enabled, the process proceeds to Step S153. The display image processing unit 51 determines whether or not the still-image-preferred mode is enabled. When it is determined at Step S153 that the still-image-preferred mode is enabled, the process proceeds to Step S154. The display image processing unit 51 and the monitoring control unit 52 preferentially perform a still-image-preferred display process. The process then terminates. The still-image-preferred display process will be described later in detail.

When it is determined at Step S153 that the still-image-preferred mode is not enabled, the process proceeds to Step S155. The display image processing unit 51 determines whether or not the shutter curtain image display mode is enabled. When it is determined at Step S155 that the shutter curtain image display mode is enabled, the process proceeds to Step S156. The display image processing unit 51 and the monitoring control unit 52 preferentially perform a process to display the shutter curtain image. The process then terminates. The process to display the shutter curtain image will be described later in detail.

When it is determined at Step S155 that the shutter curtain image display mode is not enabled, the process proceeds to Step S157. The display image processing unit 51 determines whether or not the icon display mode is enabled. When it is determined at Step S157 that the icon display mode is enabled, the process proceeds to Step S158. The display image processing unit 51 and the monitoring control unit 52 preferentially perform a process to display an icon. The process then terminates. The process to display the icon will be described later in detail.

When it is determined at Step S157 that the icon display mode is not enabled, the semi-transmissive display mode is enabled. The process proceeds to Step S159. The display image processing unit 51 and the monitoring control unit 52 preferentially perform a semi-transmissive display process. The process then terminates. The semi-transmissive display process will be described later in detail.

Figure 13:
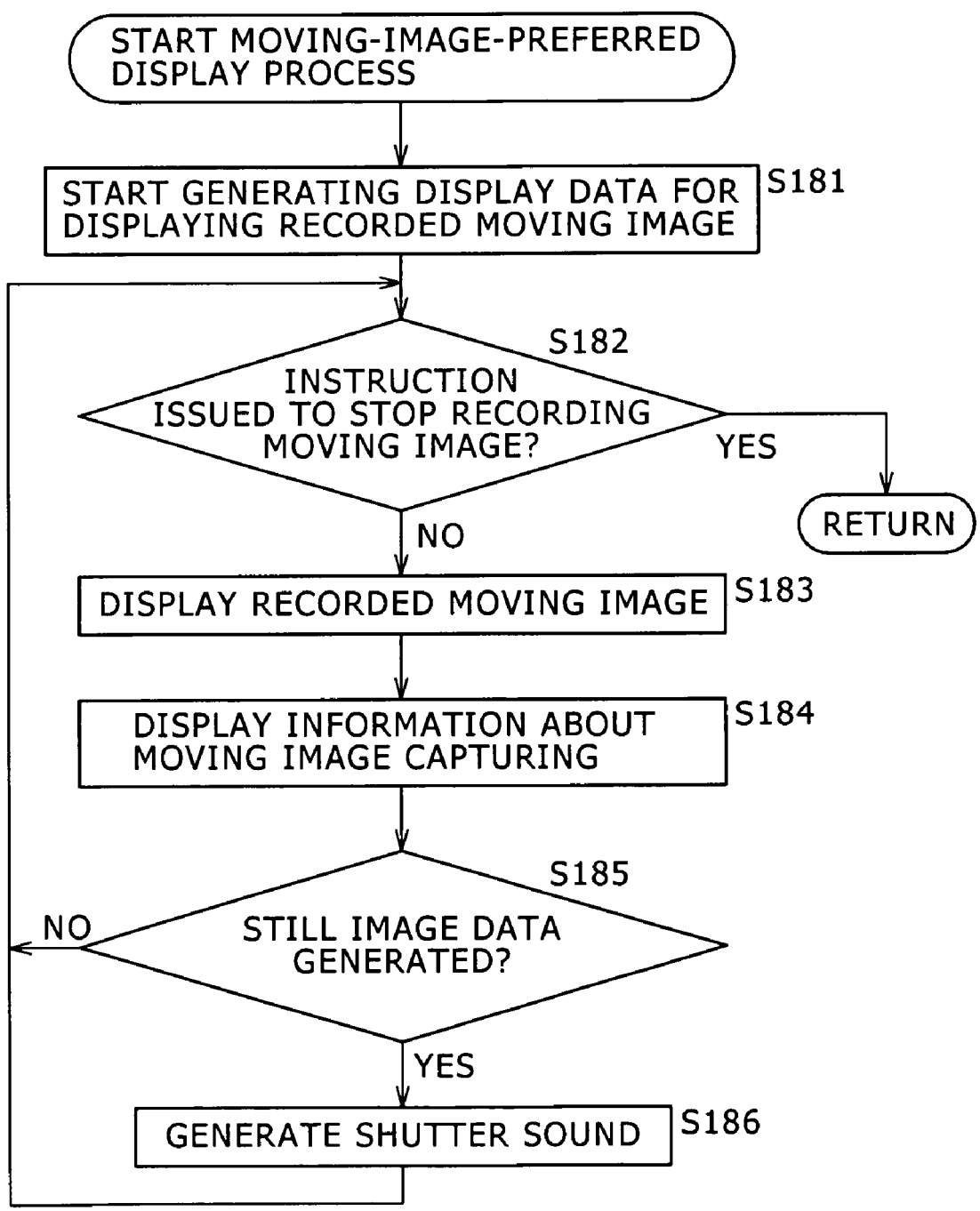
FIG. 13 is a flowchart showing a process to preferentially display a moving image.

Referring now to the flowchart in FIG. 13, the following describes the moving-image-preferred display process corresponding to the process at Step S152 in FIG. 12. At Step S181, the display image generation unit 72 of the display image processing unit 51 uses the image signal supplied from the moving image processing unit 15 to start generating display data for displaying recorded moving images. At Step S181, the display image generation unit 72 starts generating display data for displaying the moving image corresponding to the moving image displayed by the generated moving image data. The display data for displaying the moving image is supplied to the monitoring control unit 52.

At Step S182, the display image generation unit 72 uses a signal from the moving image processing unit 15 to determine whether or not an instruction is issued to stop recording a moving image. In other words, at Step S182, the display image generation unit 72 uses a signal from the moving image processing unit 15 to determine whether or not an instruction is issued to stop generating moving image data.

When it is determined at Step S182 that no instruction is issued to stop recording the moving image (or to stop generating the moving image data), the process proceeds to Step S183. The monitoring control unit 52 uses the display data supplied from the display image generation unit 72 to allow the display unit 53 to display the recorded moving image. That is, the monitoring control unit 52 uses the display data supplied from the display image generation unit 72 to allow the display unit 53 to display a moving image corresponding to the moving image displayed by the generated moving image data.

The display image generation unit 72 generates display data for displaying the information about the moving image capturing. At Step S184, the monitoring control unit 52 acquires that display data from the display image generation unit 72. The monitoring control unit 52 uses the display data to allow the display unit 20 to display the information about the moving image capturing.

At Step S185, the display image processing unit 51 uses the signal supplied from the still image processing unit 14 to determine whether or not the still image processing unit 14 generates still image data. When it is determined at Step S185 that the still image data is generated, the process proceeds to Step S186. The display image processing unit 51 notifies the monitoring control unit 52 that the still image data is generated. When the display image processing unit 51 notifies that the still image data is generated, the monitoring control unit 52 allows the audio output unit 54 to generate the shutter sound. The process returns to Step S182 and is repeated thereafter.

When it is determined at Step S185 that no still image data is generated, the process skips Step S186, returns to Step S182, and repeats the above-mentioned steps.

When it is determined at Step S182 that an instruction is issued to stop recording the moving image (or to stop generating the moving image data), the process terminates.

Figure 14:
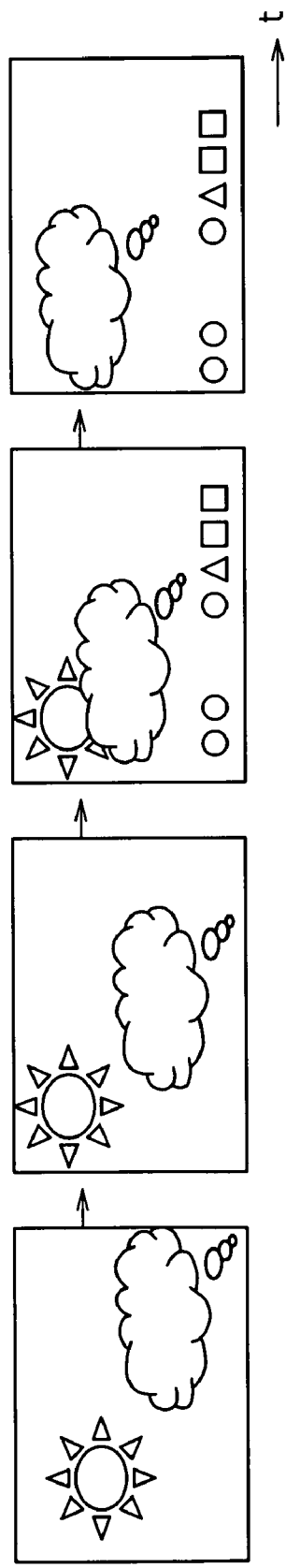
FIG. 14 exemplifies images displayed on the display unit.

As shown in FIG. 14, the display unit 53 can continuously display the recorded moving image.

The moving-image-preferred display process is chiefly effective for moving image recording when an object moves excessively to make the framing difficult or when a still image is recorded to complement the moving image recording.

Figure 15:
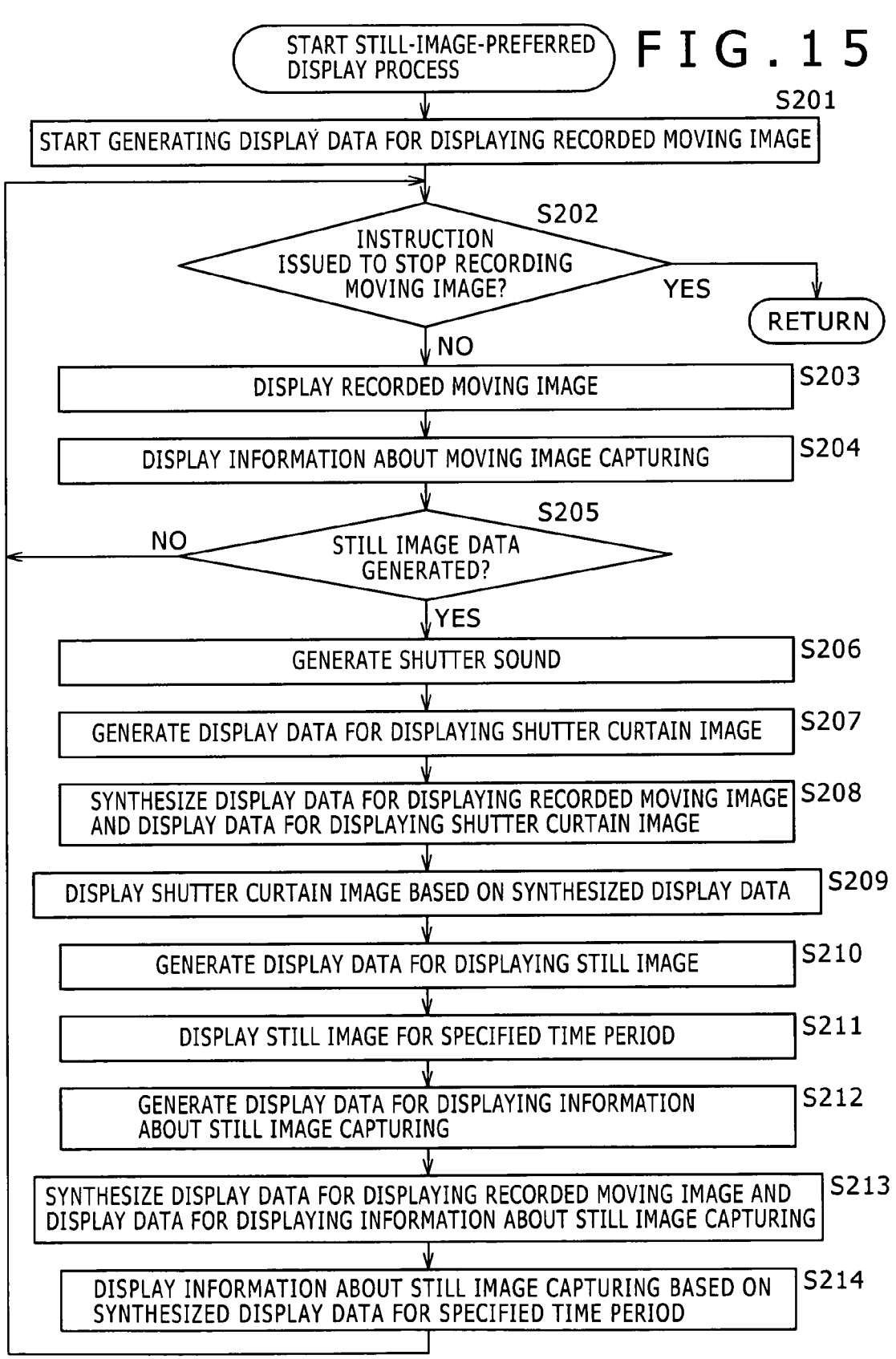
FIG. 15 is a flowchart showing a process to preferentially display a still image.

Referring now to the flowchart in FIG. 15, the following describes the still-image-preferred display process corresponding to the process at Step S154 in FIG. 12. The process from Steps S201 to S205 is similar to the process from Steps S181 to S185 in FIG. 13 and a description is omitted.

At Step S206, the display image processing unit 51 notifies the monitoring control unit 52 that the still image data has been generated. Notified from the display image processing unit 51 that the still image data has been generated, the monitoring control unit 52 allows the audio output unit 54 to generate the shutter sound.

At Step S207, the display image generation unit 71 uses the prestored data to generate display data for displaying the shutter curtain image (the image simulating the shutter curtain). The display image generation unit 71 supplies the generated display data to the monitoring control unit 52.

At Step S208, the image synthesis unit 91 of the monitoring control unit 52 synthesizes two pieces of display data. One is the display data that is generated from the display image generation unit 72 and is used for displaying recorded moving images. The other is the display data that is generated from the display image generation unit 71 and is used for displaying the shutter curtain image (the image simulating the shutter curtain). That is, at Step S208, the image synthesis unit 91 synthesizes: the display data for displaying the moving image corresponding to the moving image displayed by the generated moving image data; and the display data for displaying the shutter curtain image (the image simulating the shutter curtain).

At Step S209, the display control unit 92 uses the synthesized display data to allow the display unit 53 to display the shutter curtain image synthesized with the moving image.

Figure 16:
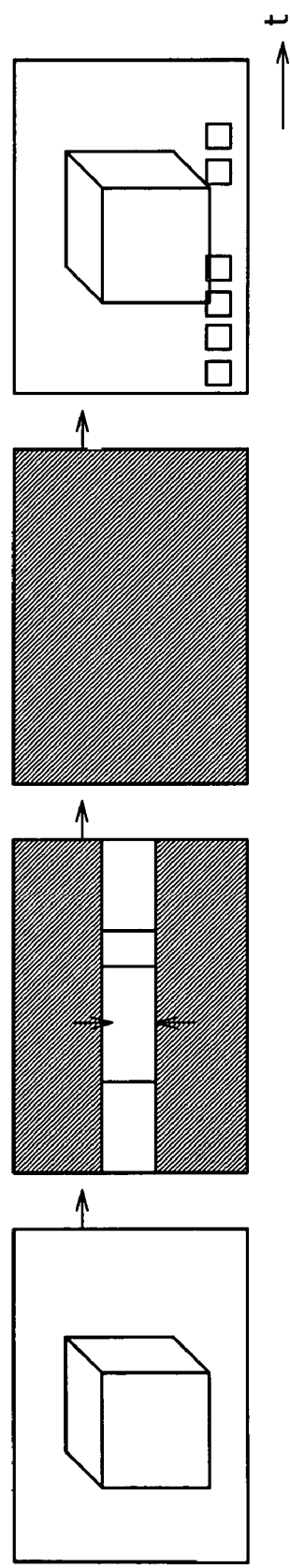
FIG. 16 exemplifies images displayed on the display unit.

For example, as shown in FIG. 16, the display unit 53 displays images simulating that the shutter curtain obstructs the moving image to represent the instant of capturing (recording) the still image.

At Step S210, the display image generation unit 71 uses the image signal to generate display data for displaying the still image corresponding to the generated still image. The image signal is supplied from the still image processing unit 14 and results from decoding the generated still image data. The display image generation unit 71 supplies the generated display data to the monitoring control unit 52.

At Step S211, the display control unit 92 of the monitoring control unit 52 supplies the display unit 53 with display data for displaying the still image and allows the display unit 53 to display the still image for a specified time period.

The still image processing unit 14 supplies the display image generation unit 71 with data indicating the photographic condition such as zooming, focusing, stopping, shutter speeds, or ISO speeds concerning the image signal applied with the process (compression coding process) for generating still image data. At Step S212, the display image generation unit 71 uses that supplied data to generate display data for displaying information about the still image capturing. The display image generation unit 71 supplies the generated display data to the monitoring control unit 52.

At Step S213, the image synthesis unit 91 of the monitoring control unit 52 synthesizes: the display data that is generated from the display image generation unit 72 and is used for displaying recorded moving images; and the display data that is generated from the display image generation unit 71 and is used for displaying the information about still image capturing. That is, at Step S213, the image synthesis unit 91 synthesizes: the display data for displaying the moving image corresponding to the moving image displayed by the generated moving image data; and the display data for displaying the information about the still image capturing.

At Step S214, the display control unit 92 uses the synthesized display data to allow the display unit 53 to display the information about capturing of the still image synthesized with the moving image for a specified time period.

For example, the display unit 53 displays the information about the still image capturing as shown at the right end of FIG. 16.

After Step S214, the process returns to Step S202 and repeats the above-mentioned steps.

When still image data is generated during the still-image-preferred display process as mentioned above, the display unit 53 displays the shutter curtain image, displays the still image corresponding to the generated still image data, and displays the information about the still image capturing.

The still-image-preferred display process is effective for capturing little moving objects. The still-image-preferred display process enables display of the information about still image capturing while continuously generating moving image data. Since an object causes little movement, the object scarcely becomes out of frame. The user can more reliably ensure the information about still image capturing.

Further, the still-image-preferred display process is effective chiefly for the purpose of recording still images such as recording moving images for complementing the still image recording.

Figure 17:
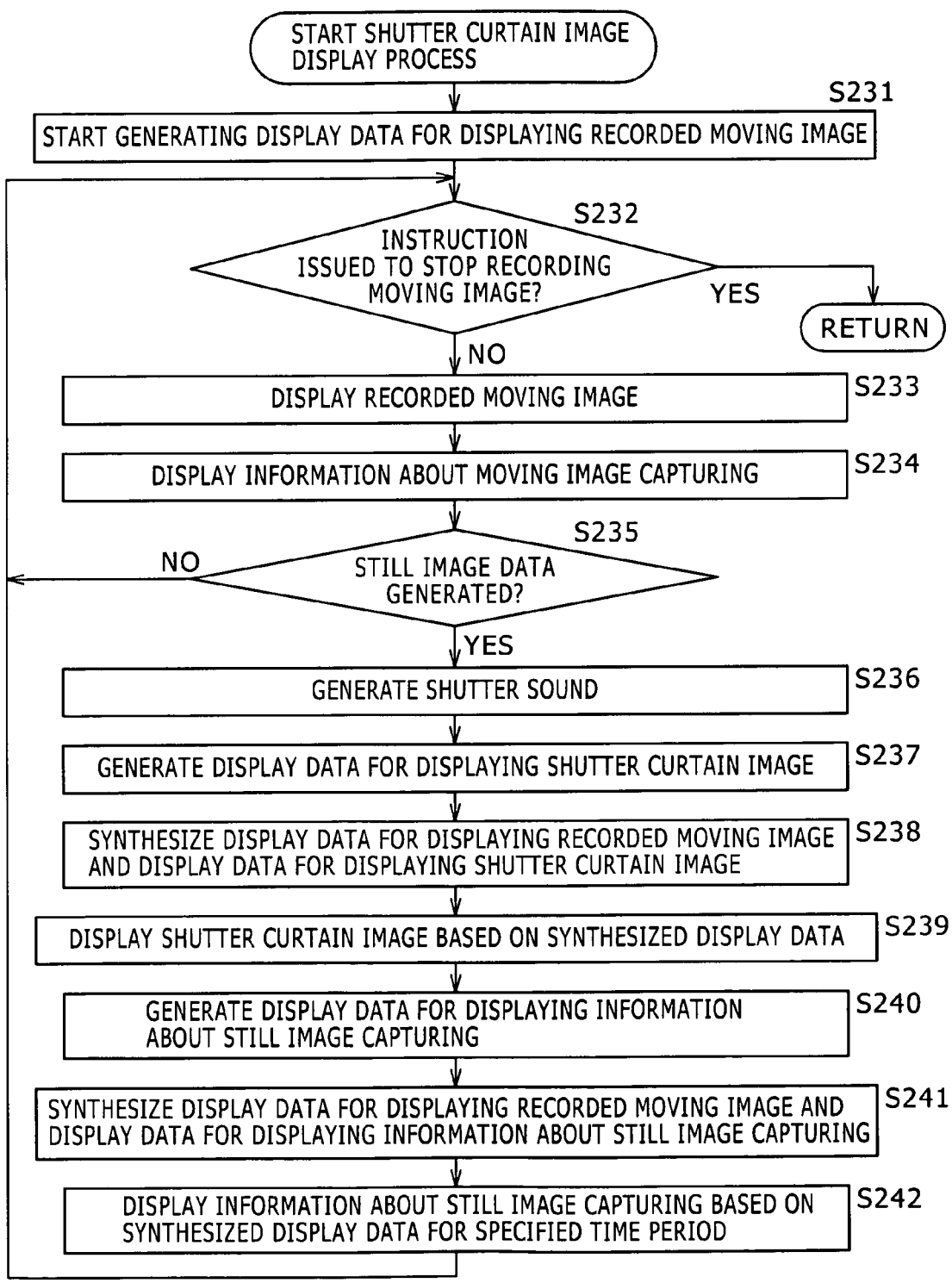
FIG. 17 is a flowchart showing a process to display a shutter curtain image.

Referring now to the flowchart in FIG. 17, the following describes the shutter curtain image display process corresponding to the process at Step S156 in FIG. 12. The process from Steps S231 to S236 is similar to the process from Steps S201 to S206 in FIG. 15 and a description is omitted.

At Step S237, the display image generation unit 71 uses the prestored data to generate display data for displaying the shutter curtain image (the image simulating the shutter curtain). The display image generation unit 71 supplies the generated display data to the monitoring control unit 52.

At Step S238, the image synthesis unit 91 of the monitoring control unit 52 synthesizes two pieces of display data. One is the display data that is generated from the display image generation unit 72 and is used for displaying recorded moving images. The other is the display data that is generated from the display image generation unit 71 and is used for displaying the shutter curtain image (the image simulating the shutter curtain). That is, at Step S238, the image synthesis unit 91 synthesizes: the display data for displaying the moving image corresponding to the moving image displayed by the generated moving image data; and the display data for displaying the shutter curtain image (the image simulating the shutter curtain).

At Step S239, the display control unit 92 uses the synthesized display data to allow the display unit 53 to display the shutter curtain image synthesized with the moving image.

Figure 18:
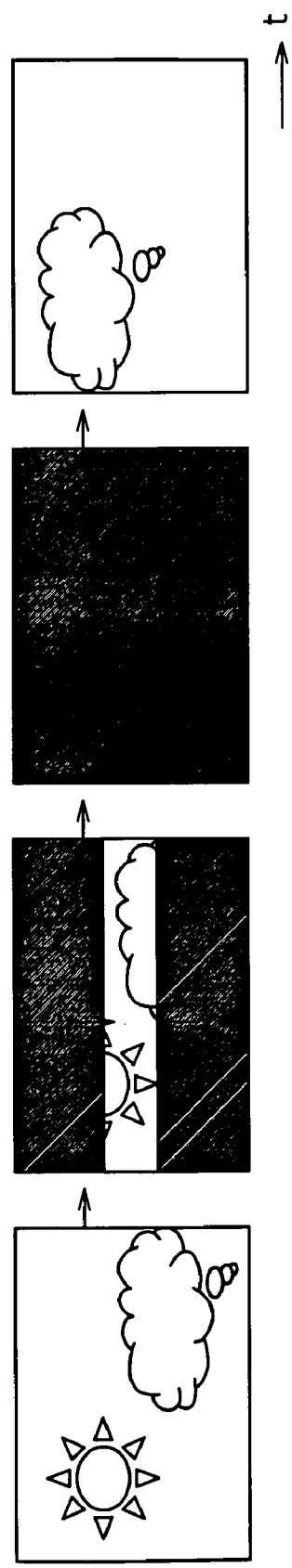
FIG. 18 exemplifies images displayed on the display unit.

For example, as shown in FIG. 18, the display unit 53 displays images simulating that the shutter curtain obstructs the moving image to represent the instant of capturing (recording) the still image.

The still image processing unit 14 supplies the display image generation unit 71 with data indicating the photographic condition such as zooming, focusing, stopping, shutter speeds, or ISO speeds concerning the image signal applied with the process (compression coding process) for generating still image data. At Step S240, the display image generation unit 71 uses that supplied data to generate display data for displaying information about the still image capturing. The display image generation unit 71 supplies the generated display data to the monitoring control unit 52.

At Step S241, the image synthesis unit 91 of the monitoring control unit 52 synthesizes: the display data that is generated from the display image generation unit 72 and is used for displaying recorded moving images; and the display data that is generated from the display image generation unit 71 and is used for displaying the information about still image capturing. That is, at Step S241, the image synthesis unit 91 synthesizes: the display data for displaying the moving image corresponding to the moving image displayed by the generated moving image data; and the display data for displaying the information about the still image capturing.

At Step S242, the display control unit 92 uses the synthesized display data to allow the display unit 53 to display the information about capturing of the still image synthesized with the moving image for a specified time period.

For example, the display unit 53 displays the information about the still image capturing as shown at the right end of FIG. 18.

In this manner, the shutter curtain image display process displays the shutter curtain image, and then immediately displays a moving image without displaying the still image corresponding to the generated still image data.

After Step S242, the process returns to Step S232 and repeats the above-mentioned steps.

When the still image data is generated during the shutter curtain image display process, the display unit 53 displays the shutter curtain image, and then immediately displays the information about still image capturing as well as the moving image. The shutter curtain image display process does not display the still image corresponding to the generated still image data.

Therefore, the shutter curtain image display process makes it possible to more easily follow moving objects than the still-image-preferred display process.

Referring now to the flowchart in FIG. 19, the following describes the icon display process corresponding to the process at Step S158 in FIG. 12. The process from Steps S251 to S256 is similar to the process from Steps S231 to S236 in FIG. 17 and a description is omitted.

At Step S257, the display image generation unit 71 uses the prestored data to generate display data for displaying an icon for displaying generation of still image data. The display image generation unit 71 supplies the generated display data to the monitoring control unit 52.

At Step S258, the image synthesis unit 91 of the monitoring control unit 52 synthesizes two pieces of display data. One is the display data that is generated from the display image generation unit 72 and is used for displaying recorded moving images. The other is the display data that is generated from the display image generation unit 71 and is used for displaying the icon representing the generation of still image data. That is, at Step S258, the image synthesis unit 91 synthesizes: the display data for displaying the moving image corresponding to the moving image displayed by the generated moving image data; and the display data for displaying the icon representing the generation of still image data.

At Step S259, the display control unit 92 uses the synthesized display data to allow the display unit 53 to display the icon and the moving image.

Figure 20:
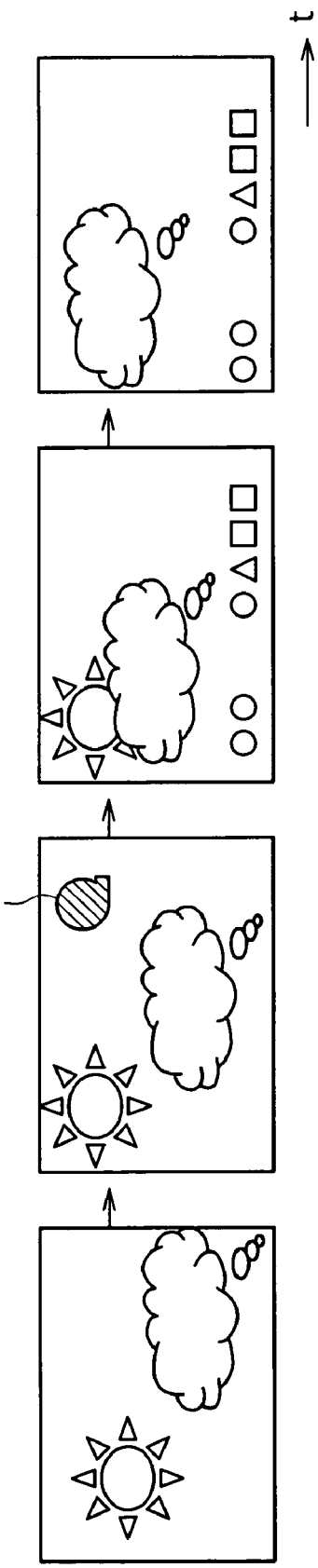
FIG. 20 exemplifies images displayed on the display unit.

As shown in FIG. 20, for example, the display unit 53 displays an icon 101 representing the instant of capturing (recording) the still image together with the moving image. The icon 101 simulates a 35 mm silver halide film case, for example.

The process from Steps S260 to S262 is similar to the process from Steps S240 to S242 in FIG. 17 and a description is omitted.

During the icon display process as mentioned above, the display unit 53 displays the icon 101 representing the instant of capturing (recording) the still image together with the moving image. Since the icon 101 is displayed on part of the surface of the display unit 53, a user can view almost the entire moving image even when the icon 101 is displayed. Immediately after displaying the icon 101, the icon display process displays a moving image without displaying the still image corresponding to the generated still image data.

Therefore, it becomes easier to follow a moving object.

Figure 21:
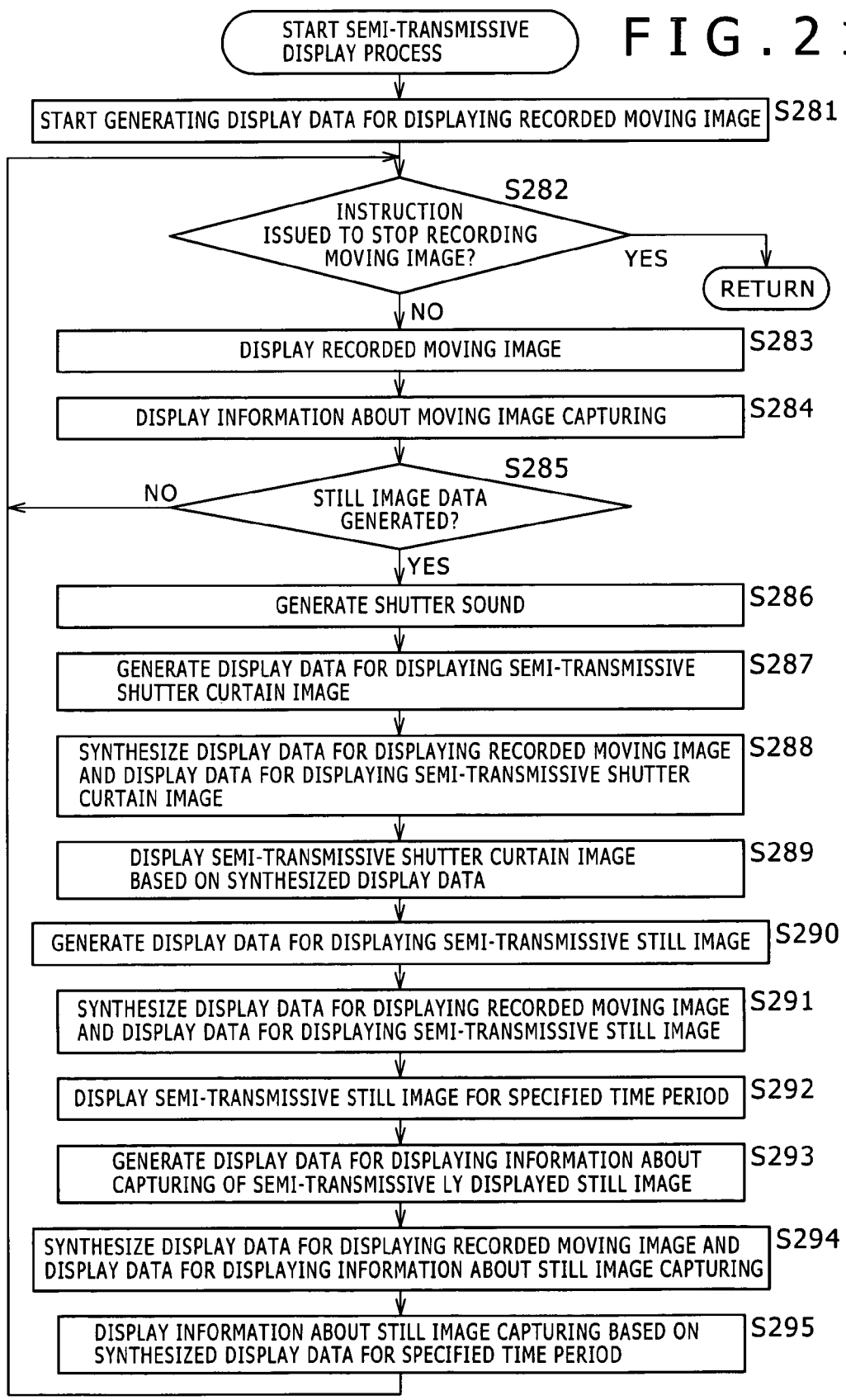
FIG. 21 is a flowchart showing a process for semi-transmissive display.

Referring now to the flowchart in FIG. 21, the following describes the semi-transmissive display process corresponding to the process at Step S159 in FIG. 12. The process from Steps S281 to S286 is similar to the process from Steps S201 to S206 in FIG. 15 and a description is omitted.

At Step S287, the display image generation unit 71 uses the prestored data to generate display data for displaying the semi-transmissive shutter curtain image (the image simulating the shutter curtain) having the transmittance determined by the process at Step S133 or S135. The display image generation unit 71 supplies the generated display data to the monitoring control unit 52.

At Step S288, the image synthesis unit 91 of the monitoring control unit 52 synthesizes two pieces of display data. One is the display data that is generated from the display image generation unit 72 and is used for displaying recorded moving images. The other is the display data that is generated from the display image generation unit 71 and is used for displaying the semi-transmissive shutter curtain image (the image simulating the shutter curtain). That is, at Step S288, the image synthesis unit 91 synthesizes the display data for displaying the moving image corresponding to the moving image displayed by the generated moving image data; and the display data for displaying the semi-transmissive shutter curtain image (the image simulating the shutter curtain).

When supplied with display data for the semi-transmissive image, the image synthesis unit 91 synthesizes display data so that the semi-transmissive image is displayed on the higher layer, i.e., both images rendered by two pieces of display data are visible.

At Step S289, the display control unit 92 uses the synthesized display data to allow the display unit 53 to display the semi-transmissive shutter curtain image synthesized with the moving image.

Figure 22:
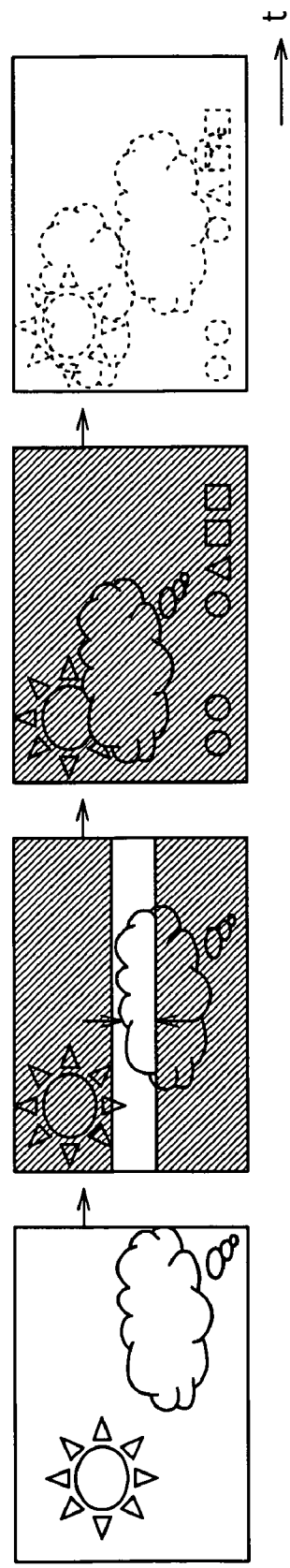
FIG. 22 exemplifies images displayed on the display unit.

For example, as shown in FIG. 22, the display unit 53 displays images simulating that the semi-transmissive shutter curtain obstructs the moving image to represent the instant of capturing (recording) the still image. Since the shutter curtain image is semi-transmissive, the user can view the entire moving image.

At Step S290, the display image generation unit 71 uses the image signal to generate display data for displaying the still image that corresponds to the generated still image data and is semi-transmissive having the transmittance determined by the process at Step S133 or Step S135. The image signal is supplied from the still image processing unit 14 and results from decoding the generated still image data. The display image generation unit 71 supplies the generated display data to the monitoring control unit 52.

At Step S291, the image synthesis unit 91 of the monitoring control unit 52 synthesizes: the display data that is generated from the display image generation unit 72 and is used for displaying recorded moving images; and the display data that is generated from the display image generation unit 71 and is used for displaying the semi-transmissive still image. That is, at Step S291, the image synthesis unit 91 synthesizes: the display data for displaying the moving image corresponding to the moving image displayed by the generated moving image data; and the display data for displaying the semi-transmissive still image corresponding to the generated still image data. At Step S292, the monitoring control unit 52 supplies the display unit 53 with display data for displaying the still image and allows the display unit 53 to display the semi-transmissive still image synthesized with the moving image for a specified time period.

As shown in FIG. 22, for example, the display unit 53 simultaneously displays the moving image and the still image. Consequently, the user can view the entire moving image as well as the still image.

The still image processing unit 14 supplies the display image generation unit 71 with data indicating the photographic condition such as zooming, focusing, stopping, shutter speeds, or ISO speeds concerning the image signal applied with the process (compression coding process) for generating still image data. At Step S293, the display image generation unit 71 uses that supplied data to generate display data for displaying information about capturing of the still image semi-transmissively displayed with the transmittance determined by the process at Step S133 or S135. The display image generation unit 71 supplies the generated display data to the monitoring control unit 52.

At Step S294, the image synthesis unit 91 of the monitoring control unit 52 synthesizes: the display data that is generated from the display image generation unit 72 and is used for displaying recorded moving images; and the display data that is generated from the display image generation unit 71 and is used for displaying the information about still image capturing. That is, at Step S294, the image synthesis unit 91 synthesizes: the display data for displaying the moving image corresponding to the moving image displayed by the generated moving image data; and the display data for displaying the information about capturing of the semi-transmissively displayed still image.

At Step S295, the display control unit 92 uses the synthesized display data to allow the display unit 53 to semi-transmissively display the information about capturing of the still image synthesized with the moving image for a specified time period.

For example, the display unit 53 displays the information about the still image capturing together with the moving image as shown at the right end of FIG. 22.

After Step S295, the process returns to Step S282 and repeats the above-mentioned steps.

In this manner, the semi-transmissive display process semi-transmissively displays the information about still images. Accordingly, recorded moving images can be continuously displayed. As a result, when a moving image and a still image are simultaneously captured, the moving image can be captured by following an object.

The display mode specifies a state of displaying a specified image corresponding to the generated moving or still image. The proper display mode can be selected in accordance with, the movement amount of image for an object captured by the camera 11.

Figure 23:
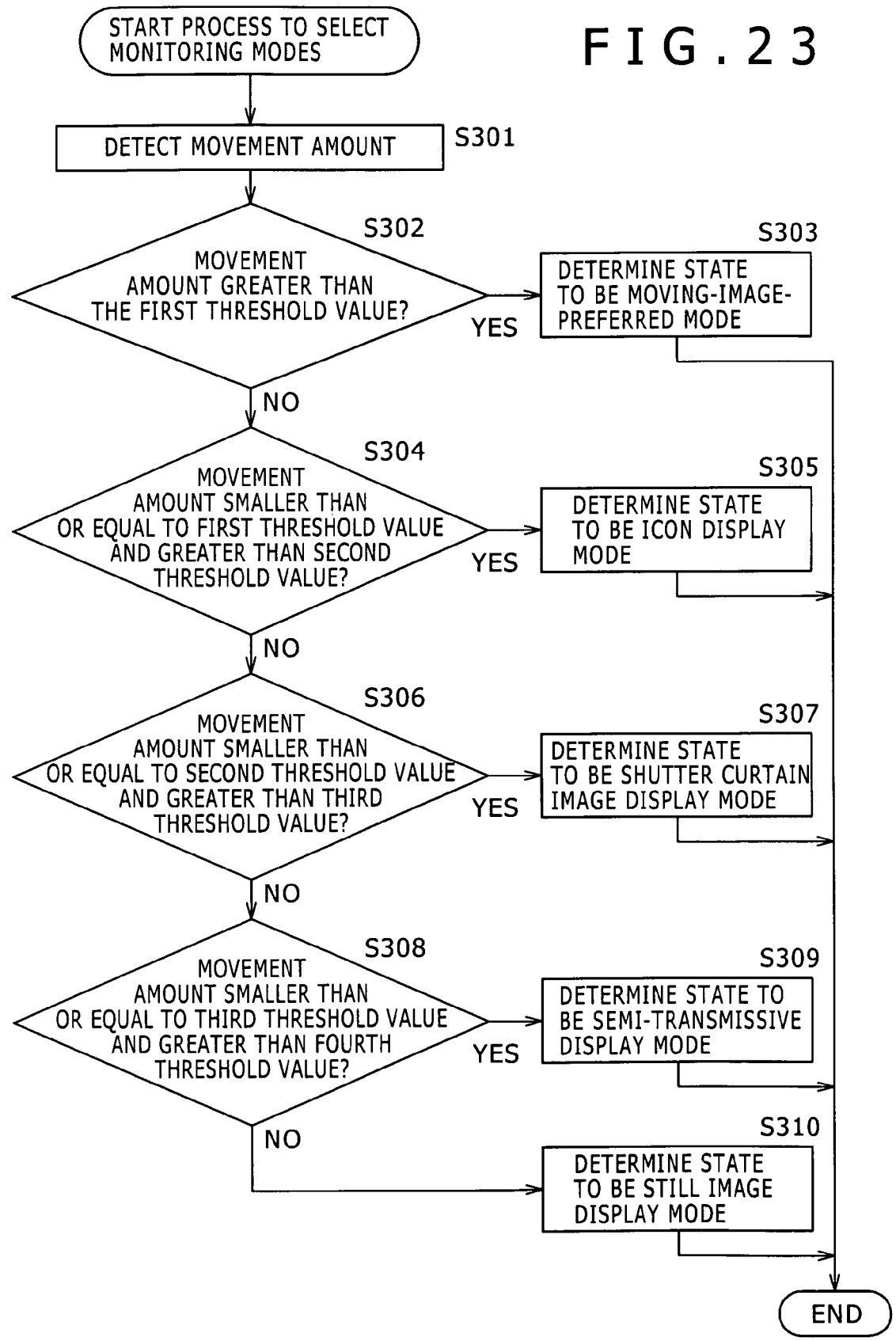
FIG. 23 is a flowchart showing another process to select monitoring modes.

FIG. 23 is a flowchart showing another process to select monitoring modes. In the following description, the first to fourth threshold values are sized to satisfy the condition of first threshold value>second threshold value>third threshold value>fourth threshold value.

At Step S301, the mode selection unit 75 uses the image signal supplied from the still image processing unit 14 or the moving image processing unit 15 and allows the movement amount detection unit 73 to detect the movement amount of image for an object captured by the camera 11.

At Step S302, the mode selection unit 75 determines whether or not the movement amount is greater than the first threshold value. When it is determined that the movement amount is greater than the first threshold value, the process proceeds to Step S303. The mode selection unit 75 assumes the state to be the moving-image-preferred mode. The process terminates.

When it is determined at Step S302 that the movement amount is smaller than or equal to the first threshold value, the process proceeds to Step S304. The mode selection unit 75 determines whether or not the movement amount is smaller than or equal to the first threshold value and is greater than the second threshold value. When it is determined that the movement amount is smaller than or equal to the first threshold value and is greater than the second threshold value, the process proceeds to Step S305. At Step S305, the mode selection unit 75 assumes the state, to be the icon display mode. The process terminates.

When it is determined at Step S303 that the movement amount is smaller than or equal to the second threshold value, the process proceeds to Step S306. The mode selection unit 75 determines whether or not the movement amount is smaller than or equal to the second threshold value and is greater than the third threshold value. When it is determined that the movement amount is smaller than or equal to the second threshold value and is greater than the third threshold value, the process proceeds to Step S307. At Step S307, the mode selection unit 75 assumes the state to be the shutter curtain image display mode. The process terminates.

When it is determined at Step S306 that the movement amount is smaller than or equal to the third threshold value, the process proceeds to Step S308. The mode selection unit 75 determines whether or not the movement amount is smaller than or equal to the third threshold value and is greater than the fourth threshold value. When it is determined that the movement amount is smaller than or equal to the third threshold value and is greater than the fourth threshold value, the process proceeds to Step S309. At Step S309, the mode selection unit 75 assumes the state to be the semi-transmissive display mode. The process terminates.

When it is determined at Step S308 that the movement amount is smaller than or equal to the fourth threshold value, the process proceeds to Step S310. The mode selection unit 75 assumes the state to be the still-image-preferred mode. The process terminates.

In this manner, it is possible to select the display modes appropriate to object movement without complicated operations.

As mentioned above, when a moving image and a still image are simultaneously captured, the moving image can be captured by following an object.

When the mode is set to display moving images, a moving image can be captured by following the object. When the image is captured, moving image data as image data for the moving image can be generated from the captured image. When the moving image data is generated, still image data as image data for the still image can be generated from the captured image. When the moving image data is generated, first display data for displaying an image corresponding to the moving image data can be generated. When still image data is generated, there may be a case of concurrently generating the first display data and second display data for displaying an image representing the generation of the still image data. When a moving image and a still image are simultaneously captured is this case, the moving image can be captured by following the object.

The imaging device is not limited to a digital camera or a digital video camera, but is eligible as merely a device having the capturing function. For example, the invention may be embodied as a personal computer or a camera-equipped mobile phone.

While there has been described that the imaging device records moving image data and still image data on the recording medium, the data may be transmitted to the other devices via a network, for example.

A sequence of the above-mentioned processes can be performed by not only the hardware, but also the software. When the software is used to perform the sequence of processes, programs constituting the software are installed from the recording medium to: a computer built in dedicated hardware; or, for example, a general-purpose personal computer that can perform various functions by installing various programs.

FIG. 24 is a block diagram exemplifying the construction of a personal computer that uses programs to perform the above-mentioned sequence of processes. A CPU (Central Processing Unit) 401 performs various processes in accordance with programs stored in ROM (Read Only Memory) 402 or a recording unit 408. RAM (Random Access Memory)

403 temporarily stores programs and data used for the CPU 401. The CPU 401, the ROM 402, and the RAM 403 are connected with each other via a bus 404.

The CPU 401 connects with an input/output interface 405 via the bus 404. The input/output interface 405 connects with an input unit 406 and an output unit 407. The input unit 406 is composed of a camera, a keyboard, a mouse, and a microphone. The output unit 407 is composed of one or two displays and a speaker. The output unit 407 is equivalent to the display unit 19, 20, or 53. The CPU 401 performs various processes correspondingly to instructions supplied from the input unit 406. The CPU 401 outputs a processing result to the output unit 407.

The input/output interface 405 connects with a recording unit 408 composed of a hard disk, for example. The recording unit 408 records a program and various data the CPU 401 uses. The recording unit 408 is equivalent to the recording medium 16 or 17. A communication unit 409 communicates with external devices via networks such as the Internet and LANs.

The communication unit 409 may be used to acquire programs and record them on the recording unit 408.

A drive 410 connected to the input/output interface 405 drives a magnetic disk 421, an optical disk 422, a magnetic optical disk 423, or semiconductor memory 424, when mounted, and acquires programs and data stored therein. The acquired program or data is transferred to the recording unit 408 as needed and is recorded therein.

The recording medium stores a program performing a sequence of processes and provides users with the program. Independently of the computer, the recording medium is provided as package media composed of the magnetic disk 421 (including flexible disks), the optical disk 422 (including CD-ROM (Compact Disc-Read Only Memory) and DVD (Digital Versatile Disc), the magnetic optical disk 423 (including MD (Mini-Disc), registered trademark), and the semiconductor memory 424. In addition, the recording medium is previously built in the computer and is provided for users in the form of ROM 402 recording programs or a hard disk included in the recording unit 408.

The program performing a sequence of processes as mentioned above may be installed in the computer as needed via the interface such as a router or a modem by means of wired or wireless communication media such as local area networks, Internet, and digital satellite broadcast.

In this specification, steps constituting the program stored in the recording medium include processes that are not only chronologically performed according to a described sequence, but also concurrently or individually performed.

In the specification, the system signifies the entire device composed of multiple devices.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device comprising: imaging means for capturing an image; moving image data generation means for generating moving image data as image data for a moving image from an image captured by the imaging means; still image data generation means for, when the moving image data generation means generates the moving image data, generating still image data as image data for a still image from an image captured by the imaging means; display data generation means for, when the moving image data is generated, generating first display data for displaying an image corresponding to the moving image data and, when the still image data is generated, generating second display data for displaying an image representing generation of the still image data in parallel with generation of the first display data; and display control means for controlling display of an image corresponding to the moving image data based on the first display data, or the still image data based on the second display data, synthesized with data about still image capturing of a still image from an image captured by the imaging means generated using data indicating a photographic condition of the imaging device, in accordance with a comparison between a detected movement amount of an object within an image captured by the imaging means and a threshold value, wherein the display data generation means generates the second display data for displaying a semi-transmissive image having transmittance corresponding to the detected movement amount.

2. The imaging device according to claim 1 further comprising:
    first display means for displaying an image corresponding to the moving image data based on the first display data; and
    second display means for displaying generation of the still image data based on the second display data.

3. The imaging device according to claim 1, further comprising:
    display means for displaying an image corresponding to the moving image data based on the first display data and displaying an image displaying generation of the still image data based on the second display data.

4. The imaging device according to claim 3, further comprising:
    selection means for selecting a display mode as a state of displaying a specified image corresponding to the moving image data or the still image data; and
    wherein the display control means is for providing the display means with control over display of the image corresponding to the moving image data or the still image data based on the first display data or the second display data correspondingly to the selected display mode.

5. The imaging device according to claim 4, further comprising:
    movement amount detection means for detecting a movement amount of the object within the moving image,
    wherein the selection means selects the display mode based on the detected movement amount.

6. The imaging device according to claim 1,
    wherein the display data generation means generates the second display data for displaying a shutter curtain image.

7. The imaging device according to claim 1,
    wherein the display data generation means generates the second display data from the still image data.

8. The imaging device according to claim 1,
    wherein the display data generation means generates the second display data for displaying an icon representing generation of the still image data.

9. The imaging device according to claim 1, further comprising:
    synthesis means for synthesizing the first display data and the second display data into third display data; and
    display control means for controlling image display based on the third display data.

10. The imaging device according to claim 9, further comprising:

selection means for selecting a display mode as a state of displaying a specified image corresponding to the moving image data or the still image data, wherein the synthesis means synthesizes the first display data and the second display data into the third display data corresponding to the selected display mode.

11. The imaging device according to claim 9, wherein the display data generation means generates the second display data for displaying a semi-transmissive image; and wherein the synthesis means synthesizes the first display data and the second display data for displaying a semi-transmissive image into the third display data.

12. The imaging device according to claim 11, further comprising: movement amount detection means for detecting the movement amount of the object within the moving image.

13. An image processing method for an imaging device having imaging means for capturing an image, comprising the steps of: generating moving image data as image data for a moving image from an image captured by the imaging means; when the moving image data generation step generates the moving image data, generating still image data as image data for a still image from an image captured by the imaging means; detecting a movement amount of an object within an image captured by the imaging means; when the moving image data is generated, generating first display data for displaying an image corresponding to the moving image data; and when the still image data is generated, generating second display data, using a display data generating unit, for displaying an image representing generation of the still image data in parallel with generation of the first display data and for displaying a semi-transmissive image having transmittance corresponding to the detected movement amount; and controlling display of an image corresponding to the moving image data based on the first display data, or the still image data based on the second display data, synthesized with data about still image capturing of a still image from an image captured by the imaging means generated using data indicating photographic condition of the imaging device, in accordance with a comparison between the detected movement amount and a threshold value.

14. A non-transitory recording medium that records a program that allows a computer for an imaging device having imaging means for capturing an image to perform the steps of: generating moving image data as image data for a moving image from an image captured by the imaging means; when the moving image data generation step generates the moving image data, generating still image data as image data for a still image from an image captured by the imaging means; and detecting a movement amount of an object within an image captured by the imaging means; when the moving image data is generated, generating first display data for displaying an image corresponding to the moving image data; when the still image data is generated, generating second display data for displaying an image representing generation of the still image data in parallel with generation of the first display data and for displaying a semi-transmissive image having transmittance corresponding to the detected movement amount; and controlling display of an image corresponding to the moving image data based on the first display data, or the still image data based on the second display data, synthesized with data about still image capturing of a still image from an image captured by the imaging means generated using data indicating a photographic condition of the imaging device, in accordance with a comparison between the detected movement amount and a threshold value.

15. An imaging device comprising: an imaging unit capturing an image; a moving image data generation unit generating moving image data as image data for a moving image from an image captured by the imaging unit; a still image data generation unit, when the moving image data generation unit generates the moving image data, generating still image data as image data for a still image from an image captured by the imaging unit; a display data generation unit, when the moving image data is generated, generating first display data for displaying an image corresponding to the moving image data and, when the still image data is generated, generating second display data for displaying an image representing generation of the still image data in parallel with generation of the first display data and for displaying a semi-transmissive image having transmittance corresponding to a detected movement amount of an object within an image captured by the imaging unit; and a display control unit controlling display of an image corresponding to the moving image data based on the first display data, or the still image data based on the second display data, synthesized with data about still image capturing of a still image from an image captured by the imaging unit generated using data indicating a photographic condition of the imaging device, in accordance with a comparison between the detected movement amount and a threshold value, wherein the display data generation unit generates the second display data for displaying a semi-transmissive image having transmittance corresponding to the detected movement amount.

16. An imaging device comprising: a display data generation unit, when moving image data is generated, generating first display data for displaying an image corresponding to the moving image data and, when still image data is generated, generating second display data for displaying an image representing generation of the still image data in parallel with generation of the first display data and for displaying a semi-transmissive image having transmittance corresponding to a detected movement amount of an object within an image captured by an imaging unit; and a display control unit controlling display of an image corresponding to the moving image data based on the first display data, or the still image data based on the second display data, synthesized with of data about still image capturing of a still image from an image captured by the imaging unit which captures an image, generated using data indicating a photographic condition of the imaging device, in accordance with a comparison between the detected movement amount and a threshold value, wherein the moving image data is generated as image data for a moving image from an image captured by the imaging unit, and the still image data is generated, when the moving image data is generated, as image data for a still image from an image captured by the imaging unit.

17. An imaging method for an imaging device comprising: generating, when moving image data is generated, first display data for displaying an image corresponding to the moving image data; generating, using a display data generating unit, when a still image data is generated, second display data for displaying an image representing generation of the still image data in parallel with generation of the first display data and for displaying a semi-transmissive image having transmittance corresponding to a detected movement amount of an object within an image captured by an imaging unit; and controlling display of an image corresponding to the moving image data based on the first display data, or the still image data based on the second display data, synthesized with data about still image capturing of a still image from an image captured by the imaging unit, generated using data indicating a photographic condition of the imaging device, in accordance with a comparison between the detected movement amount and a threshold value, wherein the moving image data is generated as image data for a moving image from an image captured by the imaging unit, and the still image data is generated, when the moving image data is generated, as image data for a still image from an image captured by the imaging unit.

18. A non-transitory recording medium that records a program that allows a computer to perform the steps of: generating, when moving image data is generated, first display data for displaying an image corresponding to the moving image data; generating, when a still image data is generated, second display data for displaying an image representing generation of the still image data in parallel with generation of the first display data and for displaying a semi-transmissive image having transmittance corresponding to a detected movement amount of an object within an image captured by an imaging unit; and controlling display of an image corresponding to the moving image data based on the first display data, or the still image data based on the second display data, synthesized with data about still image capturing of a still image from an image captured by the imaging unit, generated using data indicating a photographic condition of the imaging device, in accordance with a comparison between the detected movement amount and a threshold value, wherein the moving image data is generated as image data for a moving image from an image captured by the imaging unit, and the still image data is generated, when the moving image data is generated, as image data for a still image from an image captured by the imaging unit.

* * * * *